United States Patent
Seino et al.

(10) Patent No.: US 10,930,897 B2
(45) Date of Patent: *Feb. 23, 2021

(54) BATTERY AND BATTERY PACK

(71) Applicant: Murata Manufacturing Co., Ltd., Kyoto (JP)

(72) Inventors: Hiroshi Seino, Fukushima (JP); Fumihata Yamamoto, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 167 days.

This patent is subject to a terminal disclaimer.

(21) Appl. No.: 15/889,862

(22) Filed: Feb. 6, 2018

(65) Prior Publication Data
US 2018/0166658 A1    Jun. 14, 2018

Related U.S. Application Data

(63) Continuation of application No. 12/705,186, filed on Feb. 12, 2010, now Pat. No. 9,893,326.

(30) Foreign Application Priority Data

Feb. 20, 2009 (JP) .............................. JP2009-037565
Oct. 7, 2009 (JP) .............................. JP2009-233118

(51) Int. Cl.
*H01M 2/02* (2006.01)
*H01M 2/06* (2006.01)
(Continued)

(52) U.S. Cl.
CPC ......... *H01M 2/021* (2013.01); *H01M 2/0212* (2013.01); *H01M 2/0267* (2013.01);
(Continued)

(58) Field of Classification Search
CPC .. H01M 2/021; H01M 2/0212; H01M 2/0267; H01M 2/0275; H01M 2/06; H01M 2/08; H01M 2/30; H01M 10/0525
See application file for complete search history.

(56) References Cited

U.S. PATENT DOCUMENTS 3,990,910 A    11/1976    Giner et al.
4,100,333 A    7/1978    Haas et al.
(Continued)

FOREIGN PATENT DOCUMENTS

JP    2000-223108    8/2000
JP    2001-297736    10/2001
(Continued)

OTHER PUBLICATIONS

Hungarian Search Report for corresponding application No. 201000484-4 dated Mar. 9, 2010.
(Continued)

*Primary Examiner* — Lisa S Park
(74) *Attorney, Agent, or Firm* — K&L Gates LLP

(57) ABSTRACT

A battery is provided that includes a laminate film having a metal layer and a thermal adhesive resin layer, a battery element which is covered with the laminate film, and leads which are connected to the battery element. The leads are sandwiched between opposing thermal adhesive resin layers, and extend outside the laminate film. The thermal adhesive resin layer has thermal adhesive resin and fine resin fibers.

33 Claims, 18 Drawing Sheets

(51) Int. Cl.
*H01M 2/30* (2006.01)
*H01M 2/08* (2006.01)
*H01M 10/0525* (2010.01)

(52) U.S. Cl.
CPC ........... *H01M 2/0275* (2013.01); *H01M 2/06* (2013.01); *H01M 2/08* (2013.01); *H01M 2/30* (2013.01); *H01M 10/0525* (2013.01)

(56) References Cited

U.S. PATENT DOCUMENTS

| | | | |
|---|---|---|---|
| 4,942,091 A * | 7/1990 | Umezawa | B01D 39/1623 428/364 |
| 5,110,668 A | 5/1992 | Minnick | |
| 5,151,327 A | 9/1992 | Nishiyama et al. | |
| 5,521,024 A | 5/1996 | Sasaki et al. | |
| 5,552,239 A | 9/1996 | Gozdz et al. | |
| 5,723,568 A * | 3/1998 | Shimada | C08K 3/16 524/600 |
| 5,798,189 A | 8/1998 | Hayashida et al. | |
| 6,251,537 B1 | 6/2001 | Kim | |
| 6,267,790 B1 | 7/2001 | Daroux et al. | |
| 6,416,900 B1 | 7/2002 | Taenaka et al. | |
| 6,468,613 B1 | 10/2002 | Kitano et al. | |
| 6,511,774 B1 | 1/2003 | Tsukuda et al. | |
| 6,531,246 B2 | 3/2003 | Hanafusa et al. | |
| 6,743,546 B1 | 6/2004 | Kaneda et al. | |
| 6,797,430 B1 | 9/2004 | Hatta et al. | |
| 7,223,495 B2 | 5/2007 | Kameyama et al. | |
| 7,242,572 B2 | 7/2007 | Norton et al. | |
| 7,498,099 B2 | 3/2009 | Otohata et al. | |
| 7,510,799 B2 | 3/2009 | Hatta et al. | |
| 7,563,539 B2 | 7/2009 | Kameyama et al. | |
| 7,585,589 B2 | 9/2009 | Kim | |
| 7,645,541 B2 | 1/2010 | You et al. | |
| 7,837,814 B2 | 11/2010 | Minami et al. | |
| 7,989,105 B2 | 8/2011 | Suzuki et al. | |
| 8,017,692 B2 | 9/2011 | Kaito et al. | |
| 8,021,778 B2 | 9/2011 | Snyder et al. | |
| 8,067,113 B2 | 11/2011 | Yamashita et al. | |
| 8,163,376 B2 | 4/2012 | Hayashi et al. | |
| 9,893,326 B2 * | 2/2018 | Seino | H01M 2/021 |
| 2001/0006746 A1 | 7/2001 | Kageyama | |
| 2001/0021471 A1 | 9/2001 | Xing | |
| 2003/0049527 A1 * | 3/2003 | Yageta | H01M 2/204 429/179 |
| 2003/0082441 A1 | 5/2003 | Hovi et al. | |
| 2006/0008705 A1 | 1/2006 | Iijima et al. | |
| 2006/0166089 A1 | 7/2006 | Suzuki et al. | |
| 2006/0216594 A1 * | 9/2006 | You | H01M 2/021 429/180 |
| 2007/0128513 A1 | 6/2007 | Hatta et al. | |
| 2008/0060189 A1 * | 3/2008 | Daidoji | H01M 2/266 29/623.1 |
| 2008/0182097 A1 | 7/2008 | Mochizuki et al. | |
| 2008/0254348 A1 | 10/2008 | Hatta | |
| 2009/0143524 A1 | 6/2009 | Nakayama et al. | |
| 2009/0286141 A1 | 11/2009 | Nakamura | |
| 2011/0020673 A1 | 1/2011 | Va Schyndel | |

FOREIGN PATENT DOCUMENTS

| | | |
|---|---|---|
| JP | 2003-007269 | 1/2003 |
| JP | 2007-184189 | 7/2007 |
| JP | 2008-034556 | 2/2008 |
| JP | 2008-103315 | 5/2008 |
| JP | 2008-277238 | 11/2008 |
| JP | 3114718 | 9/2009 |
| JP | 2010-219024 | 9/2010 |
| WO | 2005/122294 | 12/2005 |

OTHER PUBLICATIONS

Hungarian Written Opinion for corresponding application No. 20100048-4 dated Mar. 9, 2010.
Japanese Office Action dated Jul. 12, 2011, for corresponding Japanese Appln. No. 2009-233118.
Japanese Office Action dated Aug. 30, 2011, for corresponding Japanese Appln. No. 2011-174779.
Search Report and Written Opinion dated Mar. 6, 2013 in corresponding Singapore Patent Application No. 201106852-5.
Search and Examination Report dated Jan. 14, 2014 in corresponding Singapore Application No. 2011068525.

* cited by examiner

BATTERY AND BATTERY PACK

CROSS REFERENCES TO RELATED APPLICATIONS

The present application is a continuation application of U.S. patent application Ser. No. 12/705,186, filed on Feb. 12, 2010, which application claims priority to Japanese Priority Patent Application JP 2009-037565 filed in the Japan Patent Office on Feb. 20, 2009; and Japanese Priority Patent Application JP 2009-233118 filed in the Japan Patent Office on Oct. 7, 2009, the entire contents of which are hereby incorporated by reference.

BACKGROUND

The present disclosure relates to a battery and a battery pack. In particular, the present disclosure relates to a battery and a battery pack using a laminate film of a metal layer and a resin layer.

In recent years, with rapid advancement in size and weight reduction of mobile information terminals, such as mobile phones, notebook-type personal computers, PDAs (Personal Digital Assistants), and the like, a high-capacity battery is increasingly demanded as a drive source. A nonaqueous electrolyte secondary battery which is represented by a lithium-ion secondary battery has a high energy density and a high capacity, so nonaqueous electrolyte secondary batteries have been widely used as a drive source for mobile information terminals, a drive source for power tools, and in-vehicle drive sources.

With the reduction in the size and weight of an electronic apparatus, there is demand for reduction in size and weight of electrical parts which are used in the electronic apparatus. For this reason, a nonaqueous electrolyte battery in which a bag-like body is used as a sealed vessel, and a nonaqueous electrolyte, a positive electrode, and a negative electrode are sealed in the bag-like body is being increasingly adopted as a power source.

The sealed vessel should have properties capable of preventing not only permeation of electrolyte and gas but also penetration of moisture from the outside. Therefore, as the material for the sealed vessel, a laminate film having a multilayer structure of resin film/metal layer/thermal adhesive resin (thermal adhesive layer) is used.

A nonaqueous electrolyte, a positive electrode, a negative electrode, and a separator arranged between the positive electrode and the negative electrode are sealed in the sealed vessel. Lead conductors with one end connected to the positive electrode and the negative electrode are arranged so as to extend from an opening of the sealed vessel to the outside of the sealed vessel, and the opening is sealed by fusion-bonding. In this way, the nonaqueous electrolyte battery can be made.

At a thermal adhesive portion (hereinafter, referred to as a seal portion) of the opening from which the lead conductors are extended, opposing thermal adhesive layers are bonded together. At a portion of the seal portion where a lead conductor is interposed between the thermal adhesive layers of the laminate film, the thermal adhesive layers of the laminate film are bonded to the lead conductor.

The seal portion should have not only excellent adhesion and sealing properties by fusion-bonding but also properties of not short-circuiting between the lead conductor and the metal layer disposed inside the thermal adhesive layer of the laminate film as a result of deformation during fusion-bonding.

For this reason, various contrivances have been made with respect to a layer disposed between the lead conductor and the metal layer of the laminate film. Further, an insulating coating layer is provided so as to coat the lead conductor, and various contrivances have been made with respect to the insulating coating layer.

Japanese Patent No. 3114719 discloses a technique in which a layer of maleic acid modified polyolefin having good adhesion with the lead conductor is provided as an insulating coating layer on the lead conductor and further a layer of cross-linked polyethylene having a gel percentage of 20% to 90% is provided outside the insulating coating layer.

JP-A-2001-297736 discloses a technique in which fusion-bonding is enabled at low temperature and the sealing effect is improved by interposing acid-modified linear low-density polyethylene between a lead conductor and a sealed vessel.

JP-A-2003-7269 discloses a technique in which a film made by laminating a high-fluidity polypropylene layer, which easily deforms due to heat and pressure applied during heat-sealing, and a low-fluidity polypropylene layer, which does not so easily deform is provided between a lead conductor and a sealed vessel. With this technique, short-circuit between a lead conductor and the metal layer of a laminate film can be prevented.

In recent years, a battery is increasingly used as an in-vehicle battery or the like in which large-current discharge will be made. In the case of large-current discharge, in order to reduce heat generated from the lead conductor at the time of discharge, it is necessary to increase the width of the lead conductor or the number of lead conductors. When the lead conductor has a large width, it is difficult to extend the lead conductors of the positive electrode and the negative electrode from the same side of the battery. For this reason, it is necessary to extend the lead conductor of the positive electrode and the lead conductor of the negative electrode from different sides of the battery.

However, according to the technique disclosed in Japanese Patent No. 3114719, the adhesion property varies depending on the degree of cross-linking of cross-linked polyethylene. For this reason, the technique disclosed in Japanese Patent No. 3114719 has a problem in that productivity is degraded because of control that should be made to secure adhesion by correctly controlling the degree of cross-linking.

The technique disclosed in JP-A-2001-297736 has a problem in that short-circuit is likely to occur due to softening or flowing of the interposed film at the time of fusion-bonding, and it is rather difficult to achieve fusion-bonding by controlling the application of pressure and heat so as to avoid the short-circuit.

The technique disclosed in JP-A-2003-7269 has a problem in that, if fusion-bonding is performed under a temperature condition exceeding the melting point of low-fluidity resin, short-circuit is likely to occur, and it is rather difficult to achieve good adhesion under such conditions as to avoid the short-circuit.

If the lead conductor of the positive electrode and the lead conductor of the negative electrode are extended from different sides, the area of the seal portion increases, which causes degradation of volume energy density. When the number of lead conductors increases, when the opening from which the lead conductor is extended is fusion-bonded, the lead conductors are likely to be in contact with each other, so leakage or short-circuit is likely to occur. For this reason, when the number of lead conductors increases, it is difficult to extend a plurality of lead conductors from the same side of the battery.

Thus, it is desirable to provide a battery and a battery pack which achieve ease of control when a seal portion is fusion-bonded, are capable of fusion-bonding the seal portion with good adhesion and sealing properties, and are capable of suppressing occurrence of short-circuit between a metal layer and a lead conductor when the seal portion is fusion-bonded. It is also desirable to provide a battery which is capable of suppressing short-circuit between lead conductors and has good energy density per volume.

SUMMARY

One embodiment provides a battery including a laminate film having a metal layer and a thermal adhesive resin layer, a battery element which is covered with the laminate film, and leads which are connected to the battery element, are sandwiched between opposing thermal adhesive resin layers, and extend outside the laminate film. The thermal adhesive resin layer has thermal adhesive resin and fine resin fibers.

Another embodiment provides a battery including a laminate film having a metal layer and a thermal adhesive resin layer, a battery element which is covered with the laminate film, leads which are connected to the battery element, are sandwiched between opposing thermal adhesive resin layers, and extend outside the laminate film, and a sealant provided between the leads and the thermal adhesive resin layer. The sealant has thermal adhesive resin and fine resin fibers.

Still another embodiment provides a battery pack including a first laminate film having a first metal layer and a first thermal adhesive resin layer, a second laminate film having a second metal layer and a second thermal adhesive resin, a battery element which is housed between the first laminate film and the second laminate film, leads which are connected to the battery element, are sandwiched between the first thermal adhesive resin layer and the second thermal adhesive resin layer arranged to be opposite each other, and extend outside the first laminate film and the second laminate film, and a circuit board which is connected to the leads. At least one of the first thermal adhesive resin layer and the second thermal adhesive resin layer has thermal adhesive resin and fine resin fibers.

Another embodiment provides a battery pack including a first laminate film having a first metal layer and a first thermal adhesive resin layer, a second laminate film having a second metal layer and a second thermal adhesive resin layer, a battery element which is housed between the first laminate film and the second laminate film, leads which are connected to the battery element, are sandwiched between the first thermal adhesive resin layer and the second thermal adhesive resin layer arranged to be opposite each other, and extend outside the first laminate film and the second laminate film, a circuit board which is connected to the leads, and a sealant which is provided between the leads and the first thermal adhesive resin layer and between the leads and the second thermal adhesive resin layer. The sealant has thermal adhesive resin and fine resin fibers.

Another embodiment of the invention provides a battery including a laminate film having a metal layer and a thermal adhesive resin layer, a battery element which is covered with the laminate film, a positive electrode lead which is connected to a positive electrode of the battery element, is sandwiched between opposing thermal adhesive resin layers, and extends outside the laminate film, a negative electrode lead which is connected to a negative electrode of the battery element, is sandwiched between opposing thermal adhesive resin layers, and extends outside the laminate film, and a sealant which is provided between the positive electrode lead and the negative electrode lead, and has thermal adhesive resin and fine resin fibers. The positive electrode lead and the negative electrode lead extend in the same direction, and at least a portion of the surface of the positive electrode lead facing the negative electrode lead overlaps at least a portion of the surface of the negative electrode lead facing the positive electrode lead in a thickness direction of the battery through the sealant.

In the first to fifth embodiments, the thermal adhesive resin layer and/or the sealant has thermal adhesive resin and fine resin fibers. Therefore, ease of control is achieved when a seal portion is fusion-bonded, the seal portion can be fusion-bonded with good adhesion and sealing properties, and occurrence of short-circuit between a metal layer and a lead can be suppressed when the seal portion is fusion-bonded.

In the fifth embodiment, at least a portion of the surface of the positive electrode lead facing the negative electrode lead overlaps at least a portion of the surface of the negative electrode lead facing the positive electrode lead in the thickness direction of the battery through the sealant having thermal adhesive resin and fine resin fibers. Therefore, occurrence of short-circuit between the positive electrode lead and the negative electrode lead can be suppressed, and energy density per volume can be improved.

According to the embodiments of the invention, ease of control is achieved when a seal portion is fusion-bonded, the seal portion can be fusion-bonded with good adhesion and sealing properties, and occurrence of short-circuit between a metal layer and a lead conductor can be suppressed when the seal portion is fusion-bonded. Further, according to the embodiments of the invention, occurrence of short-circuit between a positive electrode lead and a negative electrode lead can be suppressed, and energy density per volume can be improved.

Additional features and advantages are described herein, and will be apparent from the following Detailed Description and the figures.

DETAILED DESCRIPTION

Hereinafter, embodiments will be described with reference to the drawings. The description will be provided in the following sequence.

1. First Embodiment (first example of nonaqueous electrolyte battery)

2. Second Embodiment (example of battery pack)

3. Third Embodiment (second example of nonaqueous electrolyte battery)

4. Fourth Embodiment (third example of nonaqueous electrolyte battery)

5. Fifth Embodiment (fourth example of nonaqueous electrolyte battery)

6. Other Embodiments (modification)

1. First Embodiment

<Configuration of Nonaqueous Electrolyte Battery>

Figure 1:
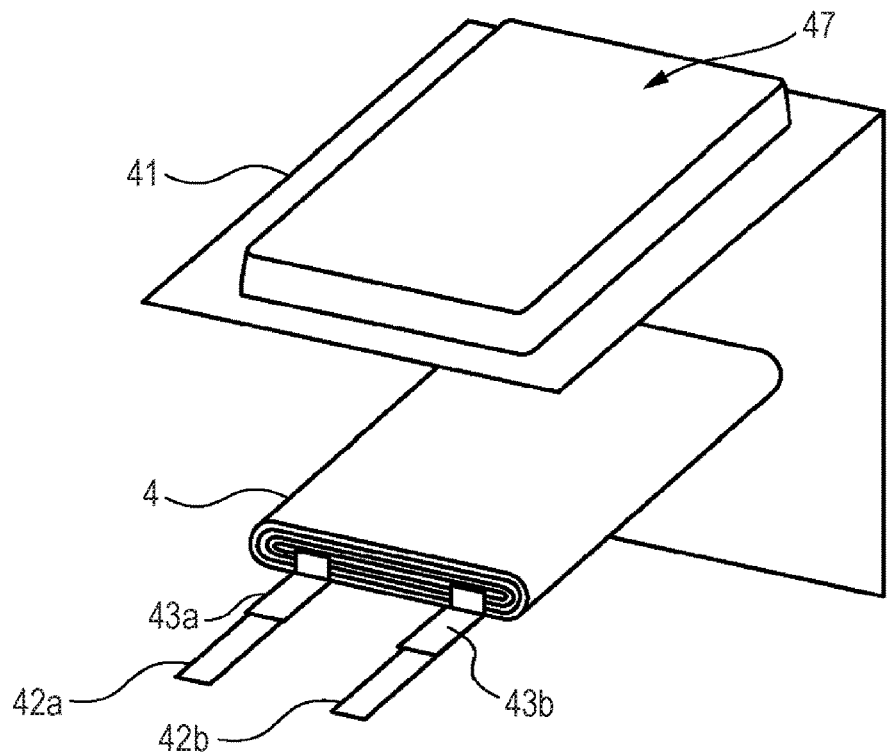
FIG. 1 is a perspective view showing the configuration of a nonaqueous electrolyte battery according to a first embodiment.
Figure 2:
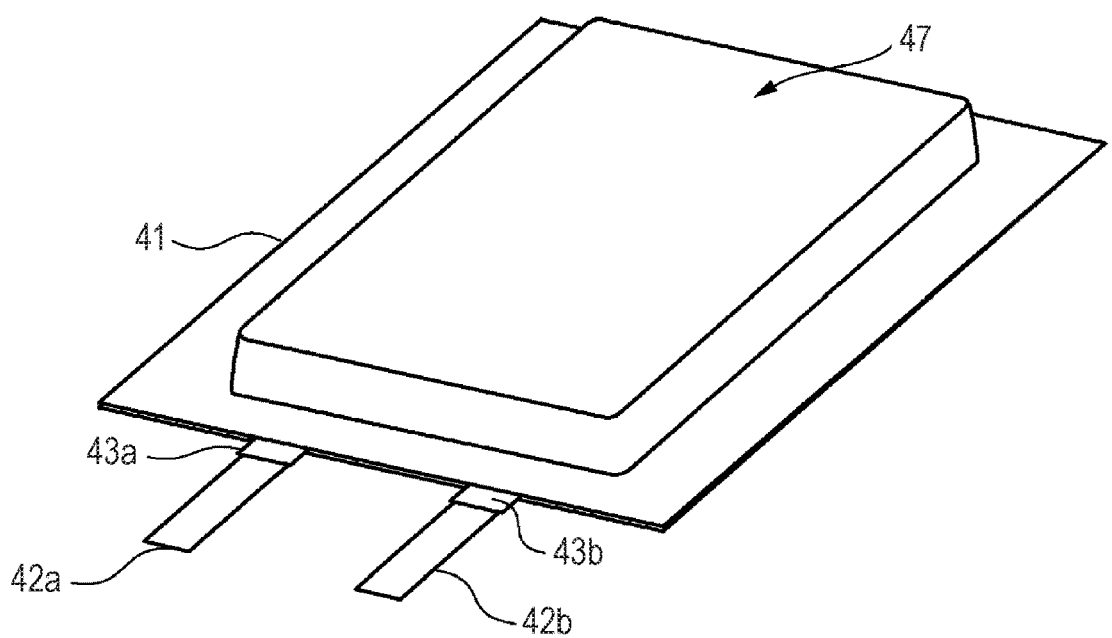
FIG. 2 is a perspective view showing the configuration of the nonaqueous electrolyte battery according to the first embodiment.
Figure 3:
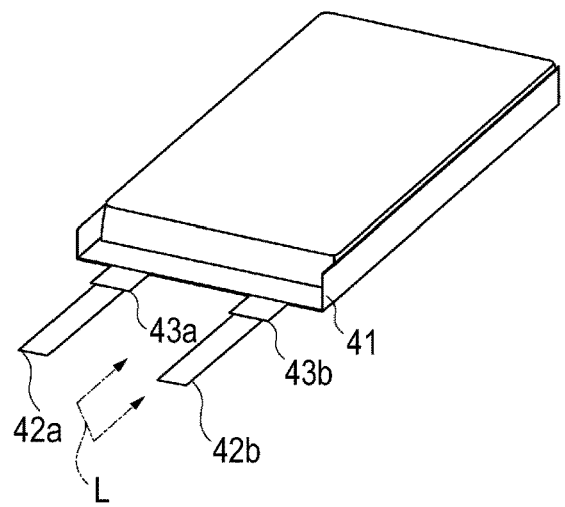
FIG. 3 is a perspective view showing the configuration of the nonaqueous electrolyte battery according to the first embodiment.

FIGS. 1 to 3 show the configuration of a nonaqueous electrolyte battery according to a first embodiment. As shown in FIGS. 1 and 2, the nonaqueous electrolyte battery has a battery element 4 which is housed in a concave portion 47 formed in a laminate film 41 and sealed by fusion-bonding three sides excluding a bent side on the periphery of the battery element 4 under reduced pressure. As shown in FIG. 3, the nonaqueous electrolyte battery is configured such that a positive electrode lead 42a and a negative electrode lead 42b (hereinafter, the positive electrode lead 42a and the negative electrode lead 42b are appropriately referred to as electrode leads 42 when it is unnecessary to distinguish them) connected to the battery element 4 extend from a seal portion of the laminate film 41 to the outside. The nonaqueous electrolyte battery shown in FIG. 3 has a configuration in which portions on both sides of the concave portion 47 are bent in a direction of the concave portion 47, as compared with the configuration of the nonaqueous electrolyte battery shown in FIG. 2.

<Battery Element 4>

The battery element 4 has, for example, an angular shape or a flat shape, and is structured such that a band-shaped positive electrode and a band-shaped negative electrode are laminated through a polymer electrolyte and/or a separator and wound in a longitudinal direction. The positive electrode lead 42a and the negative electrode lead 42b are respectively connected to the positive electrode and the negative electrode. As described below in 6. Other Embodiments, the configuration of the battery element 4 is not limited thereto.

In order to improve adhesion of the positive electrode lead 42a and the negative electrode lead 42b with the laminate film 41, a sealant 43a is disposed at a part of both surfaces of the positive electrode lead 42a, and a sealant 43b is disposed at a part of both surfaces of the negative electrode lead 42b. For convenience of description, the sealant 43a and the sealant 43b are referred to as sealants 43 when it is unnecessary to distinguish them.

The positive electrode has a positive electrode active material layer formed on a band-shaped positive electrode collector and a polymer electrolyte layer formed on the positive electrode active material layer. The negative electrode has a negative electrode active material layer formed on a band-shaped negative electrode conductor and a polymer electrolyte layer formed on the negative electrode active material layer. The positive electrode lead 42a and the negative electrode lead 42b are respectively bonded to the positive electrode conductor and the negative electrode conductor. As the positive electrode active material, the negative electrode active material, and the polymer electrolyte, the materials which have already been suggested may be used.

The positive electrode can be formed by using, as the positive electrode active material, a metal oxide, a metal sulfide, or a specific polymer depending on the kind of battery desired. For example, in the case of a lithium-ion battery, as the positive electrode active material, a lithium composite oxide or the like mainly containing $Li_xMO_2$ (where M is one or more of transition metals, and X varies depending on the charge/discharge state of the battery and is usually equal to or larger than 0.05 and equal to or smaller than 1.10). Examples of the transition metal M in the lithium composite oxide include cobalt (Co), nickel (Ni), manganese (Mn), and the like.

Specific examples of such a lithium composite oxide include $LiCoO_2$, $LiNiO_2$, $LiNi_yCo_{1-y}O_2$ (where 0<y<1), $LiMn_2O_4$, and the like. The lithium composite oxide is capable of generating a high voltage and has excellent energy density. Alternatively, as the positive electrode active material, a metal sulfide or oxide containing no lithium, such as $TiS_2$, $MoS_2$, $NbSe_2$, $V_2O_5$, and the like, may be used. For the positive electrode, a plurality of positive electrode active materials may be used together. In forming the positive electrode of such a positive electrode active material, a conductive agent or a binder may be added.

A material capable of doping or dedoping lithium may be used as the material for the negative electrode. For example, a sparingly graphitized carbon-based material or a carbon material of a graphite-based material may be used. Specifically, carbon materials, such as heat decomposable carbons, cokes (pitch coke, needle coke, and petroleum coke), graphites, vitreous carbons, organic polymer compound calcined bodies (materials resulting from carbonization by calcining phenol resin, furan resin, or the like at appropriate temperature), carbon fibers, and active carbons, may be used. Examples of the material capable of doping or dedoping lithium include polymers, such as polyacetylene, polypyrrole, and the like, and oxides, such as $SnO_2$ and the like. In forming the negative electrode of such a material, a binder or the like may be added.

The polymer electrolyte is one which is prepared by mixing a polymer material, an electrolytic solution, and an electrolyte salt and incorporating a gelled electrolyte into a polymer. The polymer material has properties such that it is compatible with the electrolytic solution. Examples of the polymer material include silicon gels, acrylic gels, acrylonitrile gels, poly-phosphazene modified polymers, polyethylene oxide, and polypropylene oxide, composite polymers, cross-linked polymers or modified polymers thereof, and fluorine-based polymers, such as poly(vinylidene fluoride), poly(vinylidene fluoride-co-tetrafluoropropylene), and poly(vinyldiene fluoride-co-trifluoroethylene), and mixtures thereof.

The electrolytic solution component includes an aprotic solvent which is able to disperse the foregoing polymer material therein, for example, ethylene carbonate (EC), propylene carbonate (PC), and butylene carbonate (BC). As the electrolyte salt, one which is compatible with the solvent is used, and a combination of cation and anion is used. Examples of the cation which can be used include alkali metals and alkaline earth metals. Examples of the anion which can be used include, $Br^-$, $I^-$, $SCN^-$, $ClO_4^-$, $BF_4^-$, $PF_6^-$, and $CF_3SO_3^-$. Specifically, lithium hexafluorophosphate or lithium tetra-fluorophosphate is used as the electrolytic salt in a concentration such that it can be dissolved in the electrolytic solution.

<Laminate Film>

Figure 4:
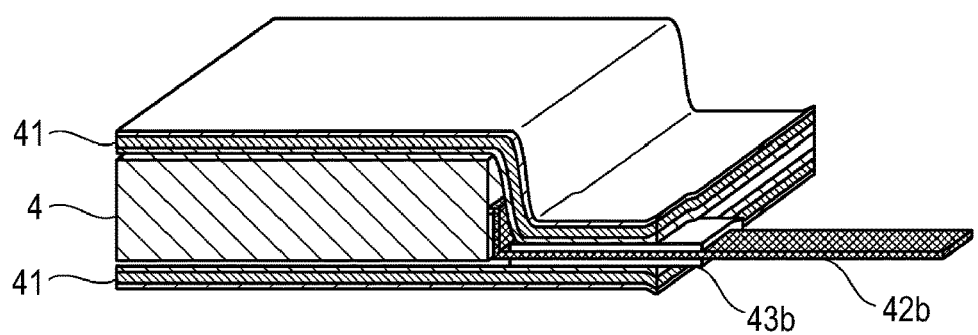
FIG. 4 is a sectional view taken along the line L of FIG. 3.

FIG. 4 is a sectional view of the nonaqueous electrolyte battery taken along the line L of FIG. 3. As shown in FIG. 4, the battery element 4 is housed in the laminate film 41. The negative electrode lead 42b connected to the battery element 4 extends outside the laminate film 41 such that a part thereof is exposed to the outside of the laminate film 41. The sealant 43b is provided at a part of both surfaces of the negative electrode lead 42b. The negative electrode lead 42b is sandwiched between the upper laminate film 41 and the lower laminate film 41 through the sealant 43b. The same is also applied to the positive electrode lead 42a and the sealant 43a.

Figure 5:
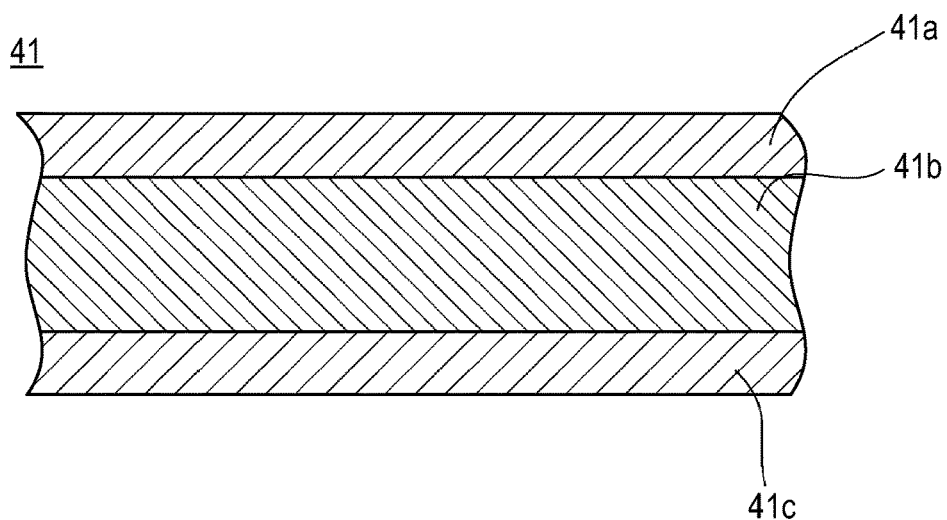
FIG. 5 is a sectional view showing the configuration of a laminate film.

FIG. 5 shows the sectional structure of the laminate film 41. The laminate film 41 is structured such that, in order from the outside toward the battery element 4, an outer resin film 41a, a metal foil 41b, an inner resin film 41c for bonding are laminated.

As the metal foil 41b, for example, aluminum or the like may be used. The material for the metal foil 41b is not limited to aluminum, but materials which have been suggested in the related art may be used. The metal foil 41b has a function for improving strength of the laminate film 41 and also a function for preventing moisture, oxygen, and light from entering and protecting the contents.

The outer resin film 41a is made of nylon (Ny), polyethylene terephthalate (PET) in terms of good appearance, toughness, and flexibility. A plurality of resins may also be selected and used. The outer resin film 41a is not limited to the one illustrated. In general, a material having a melting point higher than adhesive resin may be used. The inner resin film 41c for bonding will be described below.

In a manufacturing process of a nonaqueous electrolyte battery, first, two sides excluding a bent side of the laminate film 41 are fusion-bonded, the remaining one side becomes an opening portion, and the electrode leads 42 connected to the battery element 4 extend from the opening portion outside the laminate film 41. Thereafter, the opening portion is sealed by fusion-bonding.

At a portion of the opening portion where the electrode leads 42 are sandwiched between the upper and lower laminate films 41, the inner resin films 41c for bonding of the upper and lower laminate films 41 are opposite each other. Further, at a portion of the opening portion where the electrode leads 42 are sandwiched between the upper and lower laminate films 41, the following structure is made: upper laminate film 41/upper sealant 43/electrode lead 42/lower sealant 43/lower laminate film 41. Specifically, the following structure is made: upper outer resin film 41a/upper metal foil 41b/upper inner resin film 41c for bonding/upper sealant 43/electrode lead 42/lower sealant 43/lower inner resin film 41c for bonding/lower metal foil 41b/lower outer resin film 41a.

If the opening portion is fusion-bonded, the inner resin films 41c for bonding arranged to be opposite each other are bonded to each other. At a portion where the electrode leads 42 are sandwiched between the upper and lower laminate films 41, the sealants 43 are bonded to the electrode leads 42. The sealants 43 are bonded to the inner resin films 41c for bonding. The inner resin films 41c for bonding are bonded to the electrode leads 42 through the sealants 43.

<Configuration of Sealant 43 and Inner Resin Film 41c for Bonding>

In a battery pack according to the first embodiment, the sealants 43 and the inner resin films 41c for bonding are made of thermal adhesive resin materials described below. Hereinafter, the thermal adhesive resin materials will be described in detail.

<Thermal Adhesive Resin Material>

The thermal adhesive resin material contains thermal adhesive resin and fine resin fibers.

<Thermal Adhesive Resin>

As the thermal adhesive resin, resin having a relatively low melting point (for example, resin having a melting point equal to or lower than 170° C.) may be used. As the thermal adhesive resin, polyolefin-based resin, such as polyethylene (PE), polypropylene (PP), or the like, may be suitably used. Further, TPX (polymethylpentene polymer) or the like may be used. The thermal adhesive resin is not limited to the materials illustrated.

<Fine Resin Fiber>

The fine resin fibers refer to, for example, elongated threadlike structures having a diameter equal to or smaller than 100 μm. The sectional shape of the fine resin fibers are not particularly limited, but the fine resin fibers may be a circle, an ellipse, or a rectangle in section. Examples of the fine resin fibers include polyethylene terephthalate (PET), polybutylene terephthalate (PBT), nylon, aramid, polycarbonate (PC), polyimide (PI), polyphenylene oxide, polyphenylene sulfone (PPS), polytetrafluoroethylene (PTFE), and the like. The fine resin fibers are not limited to the materials illustrated.

The fine resin fibers preferably have a diameter of 0.1 μm to 50 μm, and more preferably, 0.5 μm to 20 μm. Further, the fine resin fibers should have a diameter smaller than the film thickness. The fine resin fibers preferably have a diameter equal to or smaller than half of the film thickness, for example. This is to enmesh necessary thermal adhesive resin for sealing on the periphery of the fine resin fibers. It is preferable that thermal adhesive resin exists in the thickness direction.

The fine resin fibers preferably have a length of 50 μm to 10000 μm, and more preferably, 200 μm to 5000 μm. If the fine resin fibers are excessively short, enmeshing between the fine resin fibers decreases, and the fine resin fibers are moved together with the flow of resin during fusion-bonding, which deteriorates resistance against short-circuit. In particular, if the blended amount is small, resistance against short-circuit is further deteriorated. If the fine resin fibers are excessively long, fluffing may occur at the time of film formation. To obtain excellent characteristics, it is important that the size of the fine resin fibers is set within a suitable range and a pseudo unwoven fabric state is formed by enmeshing between the fine resin fibers.

With observation by an SEM (Scanning Electron Microscope), the size of the fine resin fibers is obtained by measuring the diameter and length for a predetermined number (for example, 30) of fibers alternately selected and calculating the average. When the sectional shape of the fiber is a circle, the diameter of the circle becomes the diameter of the fine resin fiber. When the sectional shape of the fiber is not a circle, the maximum diameter of the sectional shape becomes a diameter. The length of the fiber is a length of the fiber in the axial direction.

If the blended amount of the fine resin fibers is excessively large, the same characteristics as in the problem when an unwoven fabric described below is used tend to be deteriorated. If the blended amount is excessively small, there is a tendency for the resin thickness to decrease due to the flow of resin, and metal foils come into contact with each other, which causes short-circuit.

When the diameter or short side length of the fine resin fibers is r μm, and the thickness of the film is t μm, the blended amount of the fine resin fibers is set to be equal to or smaller than (r/t)×100 vol % at a volume ratio with respect to thermal adhesive resin. The blended amount of the fine resin fibers is a blended amount when the sum of the transverse areas of the fine resin fibers in the axial direction and the vertical direction is substantially identical to the sectional area in the thickness direction of the film.

The diameter of the fine resin fibers is obtained by measuring in the same manner as described above. With observation by an SEM (Scanning Electron Microscope), the short side length of the fine resin fibers is obtained by measuring the maximum value of the widths of the fiber in the axial direction and the vertical direction for a predetermined number (for example, 30) of fibers alternatively selected and calculating the average.

As described above, the diameter of the fine resin fibers should be smaller than the film thickness, and preferably, the diameter of the fine resin fibers is equal to or smaller than half of the film thickness. If the diameter of the fine resin fibers is excessively smaller than the film thickness, resistance against short-circuit is deteriorated. For this reason, the diameter of the fine resin fibers is preferably larger than 10% of the film thickness. The same is also applied to the short side length of the fine resin fiber.

A preferred relationship between the film thickness t (μm) and the diameter or short side length r (μm) of the fine resin fibers is expressed by 0.1 t (μm)<r (μm)≤0.5 t (μm). Under this condition [0.1 t (μm)<r (μm)≤0.5 t (μm)], a preferred upper limit of the blended amount of the fine resin fibers calculated by the expression (r/t)×100 vol % is larger than 10 vol % and equal to or smaller than 50 vol % at a volume ratio with respect to the thermal adhesive resin.

A particularly preferred range of the blended amount of the fine resin fibers is in a range of 10 vol % to 25 vol % at a volume ratio with respect to the thermal adhesive resin in terms of excellent characteristics.

In the above-described nonaqueous electrolyte battery according to the first embodiment of the invention, ease of control is achieved when the opening portion from which the electrode leads 42 extend is fusion-bonded, and the opening portion from which the electrode leads 42 extend can be fusion-bonded with excellent adhesion and sealing properties. Further, in the nonaqueous electrolyte battery according to the first embodiment of the invention, occurrence of short-circuit between the metal foil 41*b* and the electrode leads 42 at the time of fusion-bonding can be suppressed.

<Difference from Related Art>

For ease of understanding of the nonaqueous electrolyte battery according to the first embodiment, the excellent effects of the nonaqueous electrolyte battery according to the first embodiment as compared with the related art will be described with reference to the related art.

As the related art for solving the same problem as the nonaqueous electrolyte battery according to the first embodiment, the following two methods are exemplified: (1) a method in which a film where an unwoven fabric is permeated with thermal adhesive resin is used, and (2) a method in which an inorganic filler is added.

<(1) Problem of a Method in which a Film where an Unwoven Fabric is Permeated with Thermal Adhesive Resin is Used>

According to the technique (1), the thickness or shape after being sealed is controlled by the unwoven fabric, so it is difficult to decrease the resin thickness of the unwoven fabric even after being sealed. The thermal adhesive resin layer has a thickness equal to or larger than the thickness of the unwoven fabric, and the thickness provides less flexibility than a film made of resin alone. When films overlap each other and are heat-sealed, resin portions outside the unwoven fabric are used, so it is necessary to overlap an appropriate amount of resin. Accordingly, if an unwoven fabric is used, use efficiency of resin is bad, and the thickness is larger than the film made of thermal adhesive resin alone.

An unwoven fabric is hard to deform by typical heat-sealing, so it is difficult to control the seal shape. If pressurization is released at high temperature, the unwoven fabric restores its thickness due to elasticity after heat-sealing, which makes it difficult to control the thickness of the seal portion. Further, it is necessary to allow thermal adhesive resin to permeate into the holes of the unwoven fabric. If permeation is insufficient, air bubbles are mixed in and gas is expanded at the time of heat-sealing, which results in defective seal or defective appearance. The flow of resin at the time of sealing may be limited, such that resin may not flow freely, which may cause film separation, that is, delamination. In the case of film-formation, a method is mainly adopted in which thermal adhesive resin is applied to an unwoven fabric in a molten state, and other film-forming methods are hard to adopt. The lamination method when a laminate film is formed is also limited.

<(2) Problem of a Method in which an Inorganic Filler is Added>

According to the technique (2), the same film-forming method as for thermal adhesive resin containing fine resin fibers can be adopted, but when a laminate film is molded, the sliding properties between a mold and a film are deteriorated, and molding properties are degraded. A molding machine is likely to be scratched, which may result in frequent maintenance. During heat-sealing, high heat capacity of the inorganic filler is deprived of sealing heat. Accordingly, it is necessary to set strict sealing conditions, and as a result, a laminate film may be damaged. It is necessary to increase heat supply, so when heat supply varies little, defective sealing may occur due to insufficient bonding. If the filler is detached or separated from the film, contamination may occur inside the battery, and safety of the battery may be degraded.

<Effects of Nonaqueous Electrolyte Battery According to First Embodiment>

In the nonaqueous electrolyte battery according to the first embodiment, the sealants 43a and 43b and the inner resin film 41c for bonding of the laminate film 41 are made of thermal adhesive resin materials in which fine resin fibers are added to thermal adhesive resin. Therefore, the problems inherent in the related art can be resolved. That is, in the nonaqueous electrolyte battery according to the first embodiment, the minimum amount for short-circuit prevention can be effectively added. The fine resin fibers themselves do not interfere with the flow of the thermal adhesive resin, and the thermal adhesive resin and the fine resin fibers have resin components in common. As a result, compatibility is good, and unlike an inorganic filler, there is no case where separation occurs. Even if the thermal adhesive resin and the fine resin fibers are separated and enter inside the battery, there is little effect on safety since they are softer than the inorganic filler.

In the nonaqueous electrolyte battery according to the first embodiment, there is no difference between the heat capacity of the fine resin fibers and the heat capacity of the thermal adhesive resin, heat capacity control at the time of heat-sealing does not change as compared with a case where thermal adhesive resin is used alone. In terms of molding properties, there is no case where the sliding properties of resin are deteriorated, and fine fibers are not hard such as to scratch the molding machine, and maintenance or the like does not change as compared with a case where thermal adhesive resin is used alone.

In the nonaqueous electrolyte battery according to the first embodiment, in order to manufacture a film made of a thermal adhesive resin material, such as the inner resin film 41c for bonding or the sealants 43a and 43b, various film-forming methods which have already been suggested may be adopted.

For example, a thermal adhesive resin material which contains thermal adhesive resin and fine resin fibers may be formed in a film shape by a melt extrusion method, such as a T die method, an inflation method, or the like.

In brief, the melt extrusion method is a method in which a molten material in an extruder is extruded from a die attached to the front end of the extruder and cooled so as to mold a film. The T-die method is a method in which a flat molten material extruded from a wide and flat die (T die) attached to the front end of an extruder is cooled on a roll and wound so as to form a film.

The inflation method is a method in which a molten material is extruded in a tube shape from a ring-shaped circular die, expanded to a predetermined dimension by blowing off air inside the tube, cooled, wound around a roll so as to form a film.

The thermal adhesive resin material may be formed in a film shape by a coextrusion method using an inflation method or a T-die method. The coextrusion method is a kind of melt extrusion method, in which a plurality of materials are extruded at one time so as to overlap each other. With this coextrusion method, for example, a two-layered film of a layer containing fine resin fibers and a layer containing no fine resin fibers can be formed.

For example, in the above-described first embodiment, instead of the inner resin film 41c for bonding, a two-layered film of a layer containing fine resin fibers and a layer containing no fine resin fibers manufactured by a coextrusion method may be used. Of course, the two-layered film may be used instead of the sealant 43a and 43b.

For example, by melting thermal adhesive resin, adding fine resin fibers to thermal adhesive resin, and stirring, a resin melt in which the fine resin fibers are uniformly blended can be obtained. A thermal adhesive resin material can be formed of the resin melt in a film shape in one step by the melt extrusion method.

Like the laminate film 41, with regard to the lamination method for use in manufacturing a laminate film having a plurality of layers, various methods which have already been suggested may be adopted. Examples of the methods which have already been suggested include dry lamination, heat lamination, extrusion coating, and the like.

2. Second Embodiment

<Configuration of Battery Pack>

Figure 6:
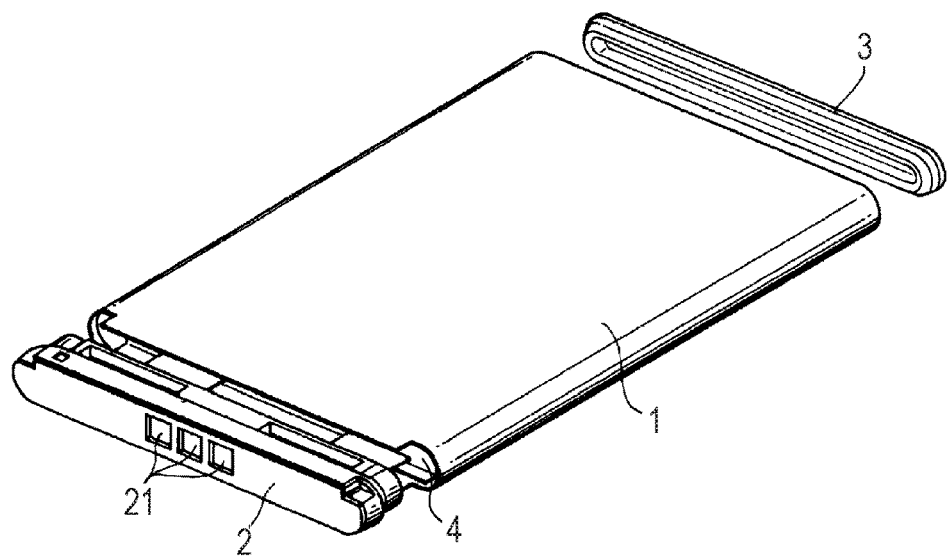
FIG. 6 is an exploded perspective view showing the configuration of a battery pack according to a second embodiment.

FIG. 6 is an exploded perspective view showing an example of the configuration of a battery pack according to a second embodiment. The battery pack is, for example, a battery pack of a lithium-ion polymer secondary battery having an angular or flat shape. As shown in FIG. 6, the battery pack is configured such that a battery element 4 is covered with an external package 1, and a top cover 2 and a bottom cover 3 are respectively engaged with openings at both ends. The top cover 2 is provided with openings 21, and contact portions of a circuit board housed in the top cover 2 face the outside through the openings 21. Hereinafter, the opening with which the top cover 2 is engaged is referred to as a top-side opening, and the opening with which the bottom cover 3 is engaged is referred to as a bottom-side opening.

Hereinafter, the battery element 4, the external package 1, the top cover 2, and the bottom cover 3 will be described.

<Battery Element 4>

The configuration of the battery element 4 is the same as the first embodiment, and thus detailed description will be omitted.

<External Package 1>

Figure 7A:
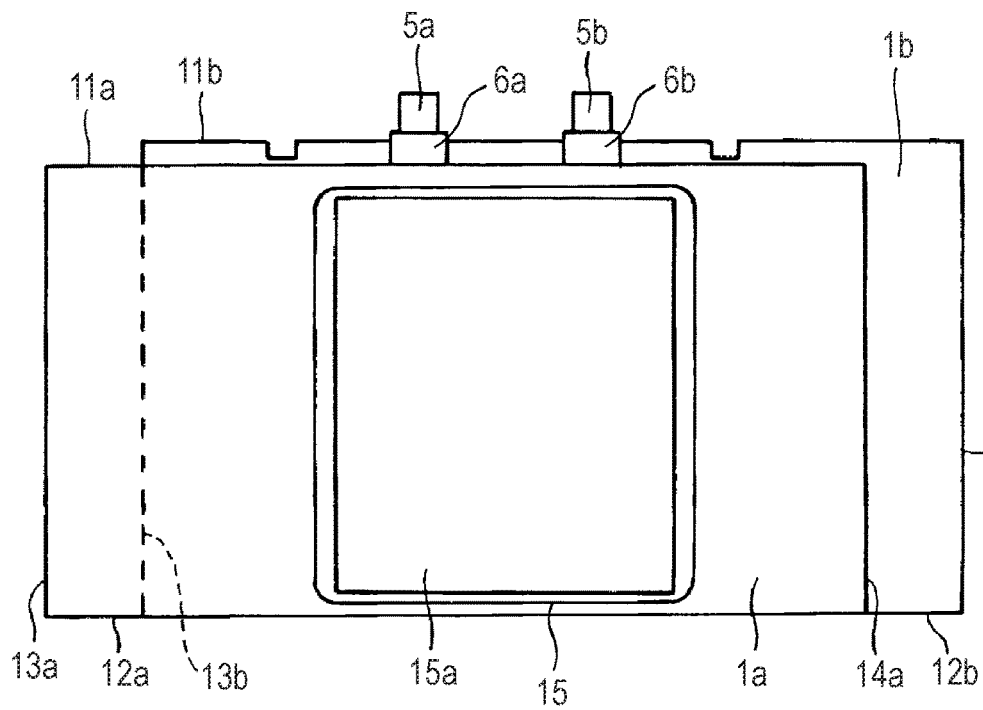
FIGS. 7A to 7C are development diagrams showing an example of the shape of an external package which covers a battery element.
Figure 7B:
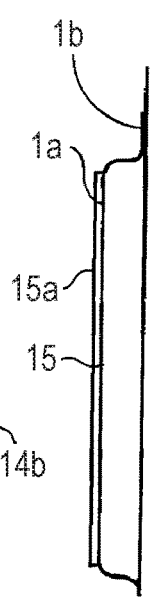
Figure 7C:
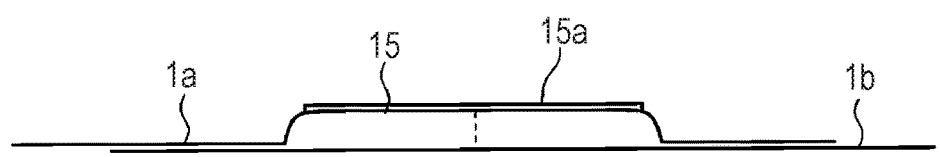

FIGS. 7A to 7C are development diagrams showing an example of the shape of the external package 1 which covers the battery element 4. As shown in FIG. 7A, the external package 1 is composed of a soft laminate film 1a which is provided with a housing portion 15 for enclosing the battery element 4, and a hard laminate film 1b which overlaps the soft laminate film 1a so as to cover the housing portion 15. A thermal adhesive sheet 15a is disposed on an outer surface at a position corresponding to the bottom surface of the housing portion 15. The housing portion 15 provided in the soft laminate film 1a is formed in a concave portion according to the shape of the battery element 4 by performing drawing processing in advance with a mold, for example.

The soft laminate film 1a is suitable for forming the housing portion 15, into which the battery element 4 is inserted, by drawing processing and is softer than the hard laminate film 1b.

Figure 8A:
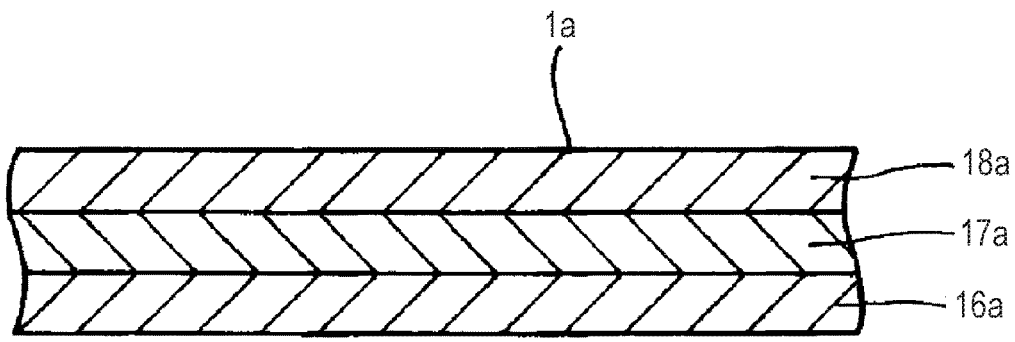
FIGS. 8A and 8B are sectional views showing the configuration of an external package.

FIG. 8A is a sectional view showing an example of the configuration of the soft laminate film 1a constituting the external package 1. The soft laminate film 1a has a moisture-proof and insulating laminate structure in which an adhesive layer 16a, a metal layer 17a, and a surface protective layer 18a are laminated in order, and the surface protective layer 18a comes into contact with the hard laminate film 1b.

The adhesive layer 16a is made of the thermal adhesive resin material described in the first embodiment. The detailed description of the thermal adhesive resin material is the same as in the first embodiment and will not be repeated. The adhesive layer 16a has a thickness of, for example, about 10 µm to 30 µm.

A metal layer 17a is made of a soft metal material, and has a function of improving strength of the external package, and preventing moisture, oxygen, and light from entering and thus protecting the contents. As the soft metal material, aluminum is most suitable in terms of lightness, stretching properties, cost, and ease of processing, and aluminum, such as 8021O or 8079O based on the JIS standard is particularly used. The metal layer 17a has a thickness of, for example, about 30 µm to 130 µm.

The surface protective layer 18a has a function of surface protection. In terms of good appearance, toughness, flexibility, and the like, polyolefin-based resin, polyamide resin, polyimide-based resin, polyester, or the like may be used. Specifically, nylon (Ny), polyethylene terephthalate (PET), polyethylene naphthalate (PEN), polybutylene terephthalate (PBT), or polybutylene naphthalate (PBN) may be used, and a plurality of materials may be selected and used. The surface protective layer 18a has a thickness of, for example, about 10 µm to 30 µm.

Figure 8B:
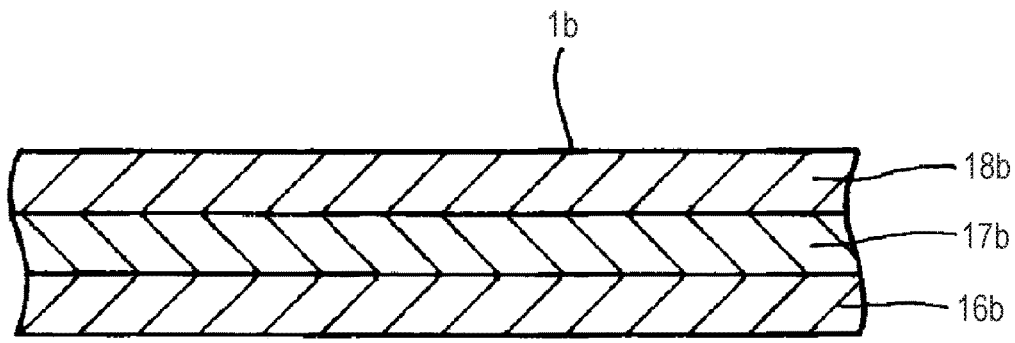

FIG. 8B is a sectional view showing an example of the configuration of the hard laminate film 1b. The hard laminate film 1b can maintain a shape after being bent, and can endure deformation from the outside. The hard laminate film 1b has a laminate structure in which an adhesive layer 16b, a metal layer 17b, and a surface protective layer 18b are laminated in order.

The adhesive layer 16b and the surface protective layer 18b of the hard laminate film 1b are the same as the soft laminate film 1a. The metal layer 17b is made of, for example, a hard metal material, and aluminum, such as 3003H18 or 3004H18 based on the JIS standard is particularly used. The thickness of each layer of the soft laminate film 1a and the hard laminate film 1b is appropriately selected in consideration of the total thickness.

The hard laminate film 1b overlaps the soft laminate film 1a so as to cover the opening surface of the housing portion 15. In this case, as shown in FIG. 7A, the positional relationship between the soft laminate film 1a and the hard laminate film 1b is deviated. The soft laminate film 1a has a top-side long side 11a and a bottom-side long side 12a having the same length, and a left-side short side 13a and a right-side short side 14a having the same length. Similarly, the hard laminate film 1b has a top-side long side 11b and a bottom-side long side 12b having the same length, and a left-side short side 13b and a right-side short side 14b having the same length. The expressions left and right show the positional relationship when viewed toward the drawing.

The long sides 11b and 12b of the hard laminate film 1b have a length such that the short sides 13b and 14b come into contact with each other or are opposite each other with a small gap in a state where the housing portion 15 in which the battery element 4 is housed is enclosed. The long sides 11a and 12a of the soft laminate film 1a have a length shorter than the long sides 11b and 12b of the hard laminate film 1b. For example, the long sides 11a and 12a of the soft laminate film 1a have a length such that the short sides 13a and 14a come into contact with each other or are opposite each other with a small gap in a state where the housing portion 15 in which the battery element 4 is housed is enclosed. The gap in the soft laminate film 1a is not limited to a small gap but may be a certain width.

The short sides 13a and 14a of the soft laminate film 1a are slightly shorter than the short sides 13b and 14b of the hard laminate film 1b. Therefore, the soft laminate film 1a and the hard laminate film 1b can be laminated such that only the hard laminate film 1b exists on the top side. When this happens, the peripheral surface of the top cover 2 provided at the top-side opening can be fusion-bonded by the adhesive layer 16b of the hard laminate film 1b. On the bottom side, the adhesive layer 16b of the hard laminate film 1b may be exposed such that the peripheral surface of the bottom cover 3 provided at the bottom-side opening can be fusion-bonded by the adhesive layer 16b of the hard laminate film 1b.

<Top Cover>

The top cover 2 is engaged with the top-side opening of the external package 1 so as to close the top-side opening. The top cover 2 is provided with a circuit board, and electrode leads 5a and 5b which are led from the battery element 4 are connected to the circuit board.

A protection circuit including a temperature protection element, such as a fuse, a PTC, a thermistor, or the like, an ID resistor for identifying a battery pack, and the like are mounted on the circuit board. A plurality of, for example, three contact portions are provided in the circuit board. The protection circuit also includes an IC for monitoring a secondary battery and controlling FETs (Field Effect Transistor) and charge/discharge control FETs.

The PTC is connected in series to the battery element 4. If the temperature of the battery element 4 is higher than a set temperature, the PTC suddenly increases in electrical resistance so as to substantially shut off a current flowing in the battery. The fuse and the thermistor are also connected in series to the battery element 4, and if the temperature of the battery element 4 is higher then a set temperature, shuts off a current flowing in the battery.

The protection circuit including the IC for monitoring the battery element 4 and controlling FETs and the charge/discharge control FETs monitors a voltage of the battery element 4 and if the voltage of the battery element 4 exceeds 4.3 V to 4.4 V, turns off the charge control FET so as to prohibit charging. The protection circuit also monitors the voltage of the secondary battery and if the voltage of the secondary battery falls below a discharge prohibition voltage, turns off the discharge control FET so as to prohibit discharging.

<Bottom Cover>

The bottom cover 3 is a resin-molded cover provided at the bottom-side end surface of the battery pack. The bottom cover 3 is engaged with the opening portion of the external package 1 which is formed when the battery cell is covered with the external package 1, and is adhered to the battery cell by fusion-bonding or the like.

<Method of Manufacturing Battery Pack>

A method of manufacturing a battery pack according to the second embodiment will be described.

<Manufacturing Step of Battery Element 4>

First, a positive electrode and a negative electrode having gel electrolyte layers formed on both surfaces, and a separator are laminated in order of the negative electrode, the separator, and the positive electrode. The laminate is wound around a flat core in the longitudinal direction multiple times, thereby manufacturing the winding type battery element 4.

<External Package Coating Step>

Next, the housing portion 15 for enclosing the battery element 4 is molded in the soft laminate film 1a by, for example, deep drawing molding. In this case, as shown in FIG. 7A, the housing portion 15 of the soft laminate film 1a is formed so as to be slightly deviated to the right from the center position. The battery element 4 is housed in the housing portion 15 formed in the soft laminate film 1a.

Next, as shown in FIG. 7A, the hard laminate film 1b is laminated at a position slightly deviated to the right with respect to the soft laminate film 1a. Thus, in a state where the soft laminate film 1a and the hard laminate film 1b are laminated, as shown in FIG. 7A, a left region where only the soft laminate film 1a is located, a right region where only the hard laminate film 1b is located occur.

The reason why the positions are deviated as described above is to enable the adhesive layer 16a of the soft laminate film 1a and the adhesive layer 16b of the hard laminate film 1b to be adhered to each other with a certain width after the end portions of the soft laminate film 1a and the hard laminate film 1b are bent outward from the bottom surface of the housing portion 15.

Next, in a state of the arrangement relationship shown in FIG. 7A, four sides on the periphery of the opening of the housing portion 15 are fusion-bonded while reducing pressure. In this case, the entire portion where the adhesive layer 16a and the adhesive layer 16b overlap each other may be fusion-bonded. In such a manner, the periphery of the housing portion 15 is fusion-bonded, thereby sealing the battery element 4.

Next, as shown in FIG. 7A, a thermal adhesive sheet 15a having a predetermined shape is provided outside the bottom surface of the housing portion 15. The thermal adhesive sheet 15a is an auxiliary member for fusion-bonding the surface protective layers 18a of the soft laminate film 1a by heating. Preferably, the thermal adhesive sheet 15a having a thickness of about 10 μm to 60 μm with respect to the total thickness and having a melting point of around 100° C. is used. The thermal adhesive sheet 15a preferably has a melting point such that heat has no effect on the battery element 4.

Figure 9:
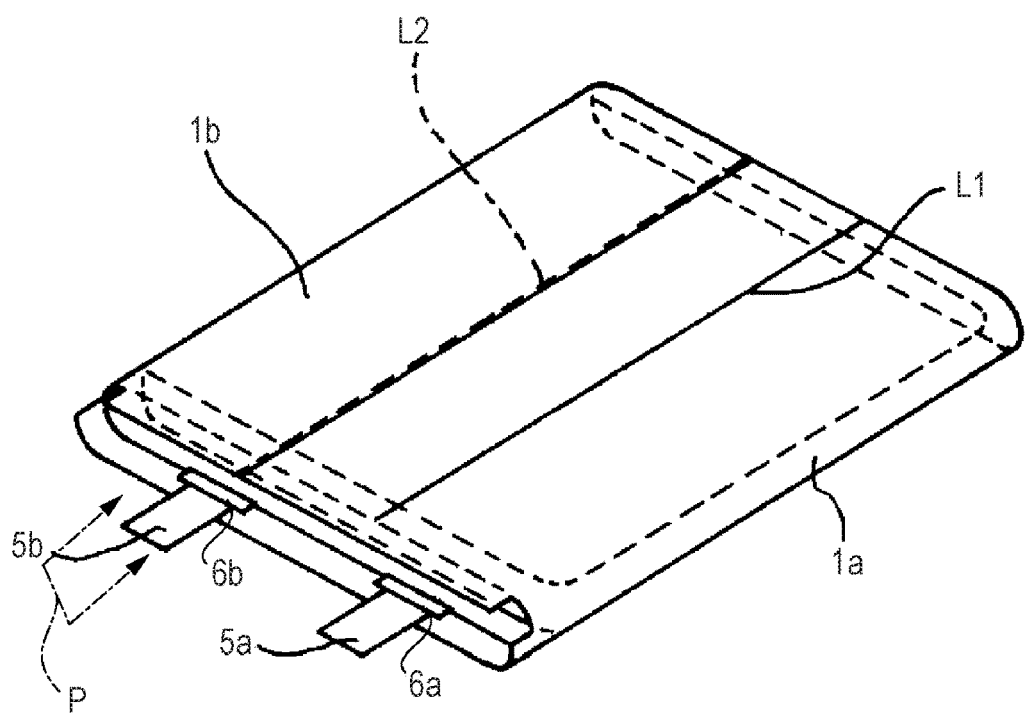
FIG. 9 is a perspective view illustrating a method of manufacturing a battery pack according to the second embodiment.

Next, as shown in FIG. 9, both ends of the soft laminate film 1a and the hard laminate film 1b, the short sides 13a and 14a and the short sides 13b and 14b are bent inwardly toward the outside of the bottom surface of the housing portion 15 of the soft laminate film 1a. Then, the end portions of the soft laminate film 1a and the hard laminate film 1b are fusion-bonded, and the soft laminate film 1a is fusion-bonded to the outside of the bottom surface of the housing portion 15. Thus, the soft laminate film 1a and the hard laminate film 1b are fixed in a closed state where the housing portion 15 in which the battery element 4 is housed is enclosed. That is, the top-side opening and the bottom-side opening are formed.

Figure 10A:
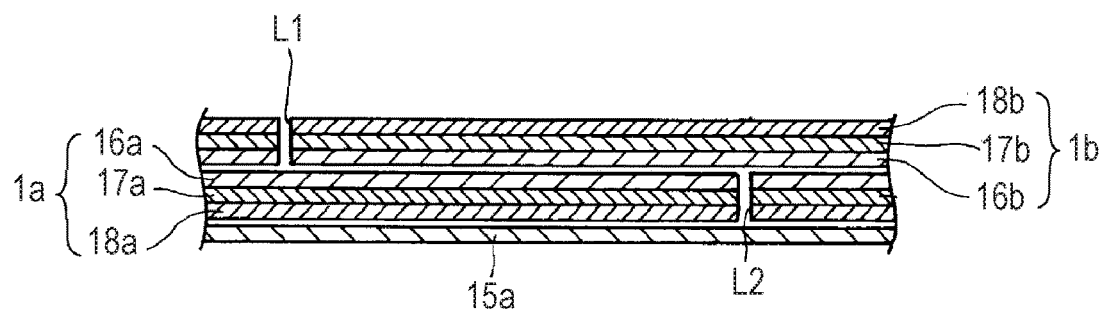
FIGS. 10A and 10B are sectional views illustrating the method of manufacturing a battery pack according to the second embodiment.

As shown in FIG. 10A, in a state where the battery element 4 is packaged, the short sides 13b and 14b of the hard laminate film 1b come into contact with each other or the end surfaces thereof are opposite each other with a small gap, and a joint L1 occurs. Inside the hard laminate film 1b, the short sides 13a and 14a of the soft laminate film 1a come into contact with each other or the end surfaces thereof are opposite each other with a small gap, and a joint L2 occurs.

FIG. 10A shows an example where the short sides 13a and 14a of the soft laminate film 1a come into contact with each other or the end surfaces thereof are opposite each other. The end surfaces of the short sides 13a and 14a of the soft laminate film 1a may be opposite each other with a gap of a certain width.

As shown in FIG. 10A, the surface protective layer 18a of the soft laminate film 1a is located in contact with the upper side of the thermal adhesive sheet 15a. Thus, the thermal adhesive sheet 15a is sandwiched between the surface protective layers 18a, so the surface protective layers 18a can be bonded to each other by applying heat from the outside. The adhesive layer 16a and the adhesive layer 16b of the soft laminate film 1a and the hard laminate film 1b are opposite and come into contact with each other, such that the adhesive layers 16a and 16b can be bonded to each other by applying heat from the outside.

Figure 10B:
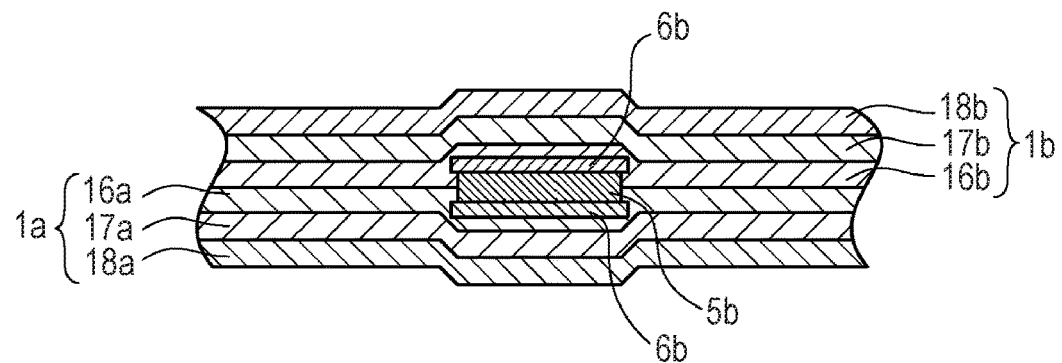

As shown in a sectional view of FIG. 10B, sealants 6b are provided on both sides of the negative electrode lead 5b, and the negative electrode lead 5b is sandwiched between the soft laminate film 1a and the hard laminate film 1b through the sealants 6b. Specifically, the negative electrode lead 5b is sandwiched between the adhesive layer 16a of the soft laminate film 1a and the adhesive layer 16b of the hard laminate film 1b through the sealants 6b. FIG. 10B is a sectional view taken along the line P of FIG. 9. The sealants 6b are made of the above-described thermal adhesive resin material. The same is also applied to sealants 6a provided on both sides of the positive electrode lead 5a.

Thus, it is possible to manufacture a battery pack in which a laminate film also serves as an external package, without using a boxlike case made of resin and without arranging frames made of resin on both sides.

<Top Cover Engagement Step>

Figure 11:
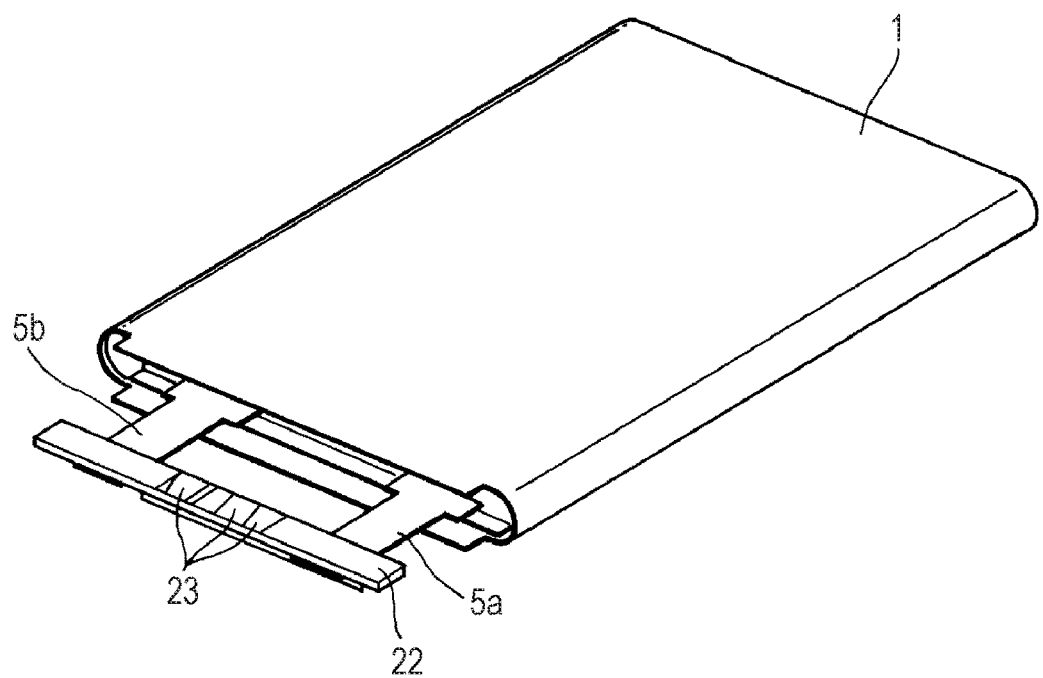
FIG. 11 is a perspective view illustrating the method of manufacturing a battery pack according to the second embodiment.
Figure 12:
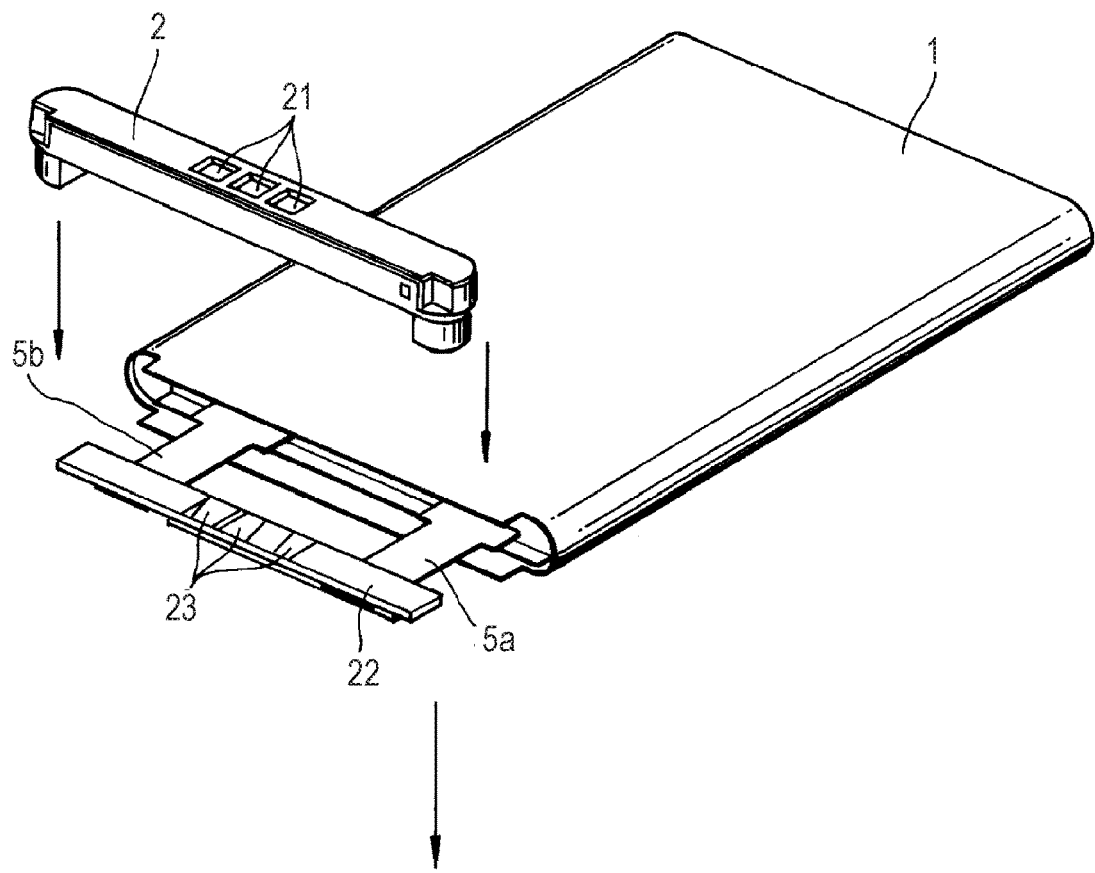
FIG. 12 is a perspective view illustrating the method of manufacturing a battery pack according to the second embodiment.
Figure 12:
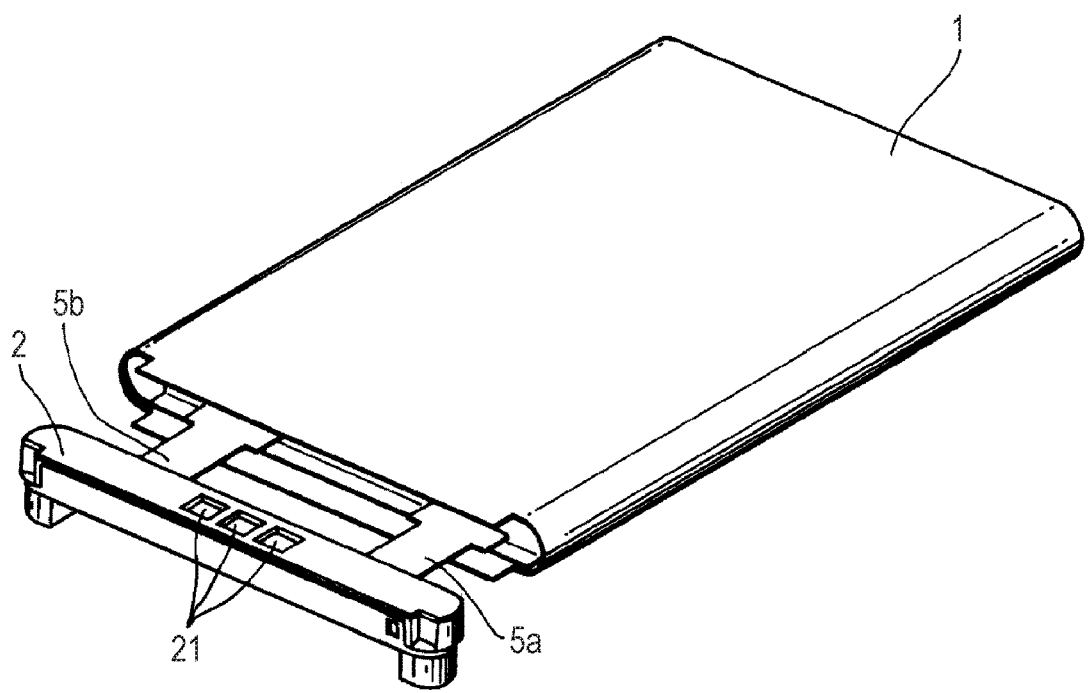

Next, as shown in FIG. 11, the electrode leads 5a and 5b are connected to a circuit board 22 by, for example, resistance welding or ultrasonic welding. Next, as shown in FIG. 12, the circuit board 22 is inserted into the opening surface of the top cover 2, and the top cover 2 is attached to the circuit board 22 so as to cover the circuit board 22. The top cover 2 is a resin-molded product manufactured by, for example, separate injection molding or the like.

A holding portion is provided in the top cover 2 so as to hold the circuit board 22 horizontally. At the top surface of the top cover 2, three openings 21 are provided at positions corresponding to the contact portions 23 of the circuit board 22. The contact portions 23 face the outside through the openings 21. The top cover 2 is set to have a width slightly smaller than the inside dimension of the height of the opening at the top-side end surface of the external package 1.

Figure 13:
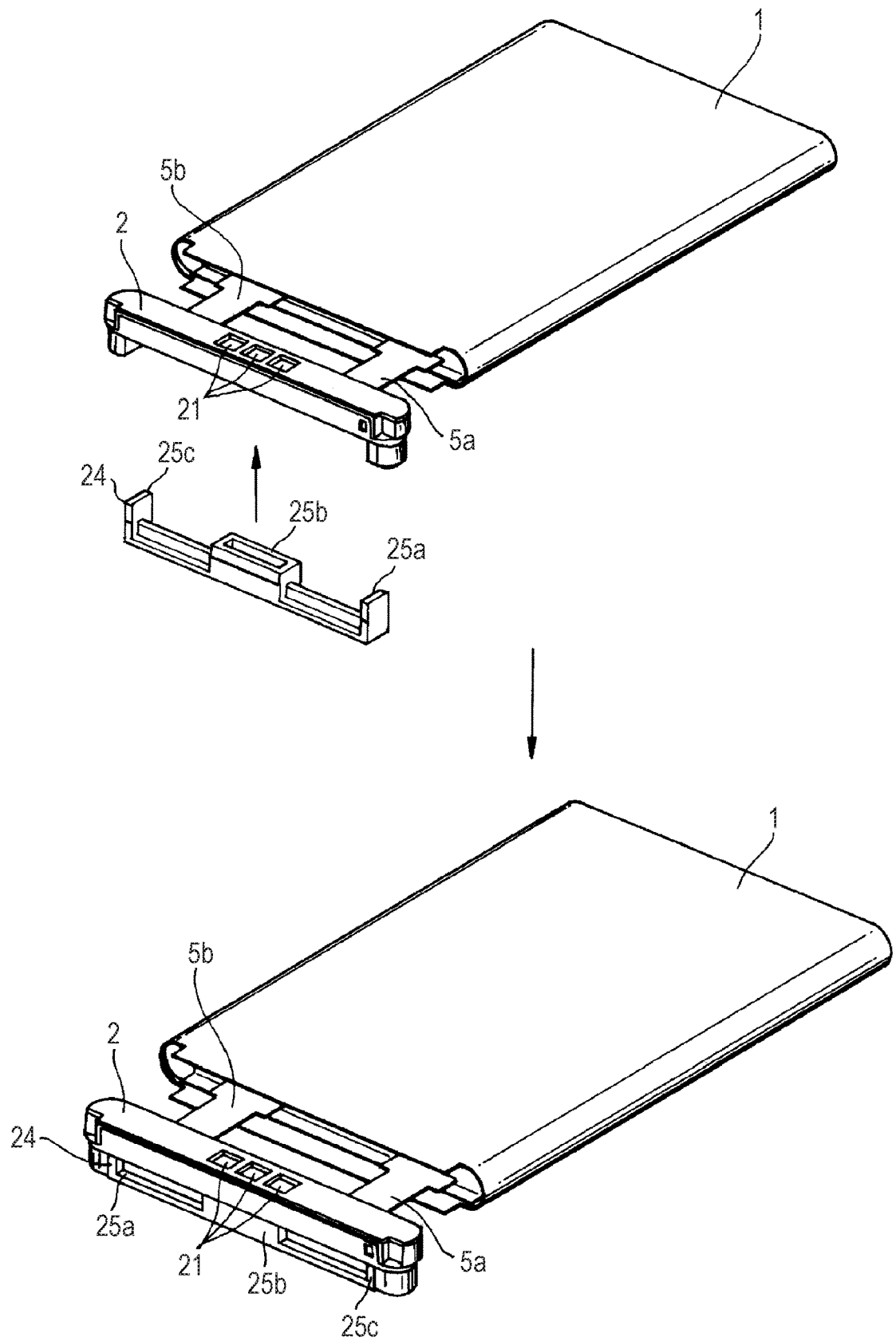
FIG. 13 is a perspective view illustrating the method of manufacturing a battery pack according to the second embodiment.

Next, as shown in FIG. 13, a holder 24 is combined with the top cover 2. The holder 24 is a resin-molded product manufactured by, for example, separate injection molding or the like. Ribs 25a, 25b, and 25c are respectively provided at both ends and the center of the holder 24 so as to protrude toward the top cover 2. The end surfaces of the ribs 25a, 25b, and 25c become surfaces for receiving the circuit board 22 in the top cover 2, so the circuit board 22 can be reliably supported.

Figure 14:
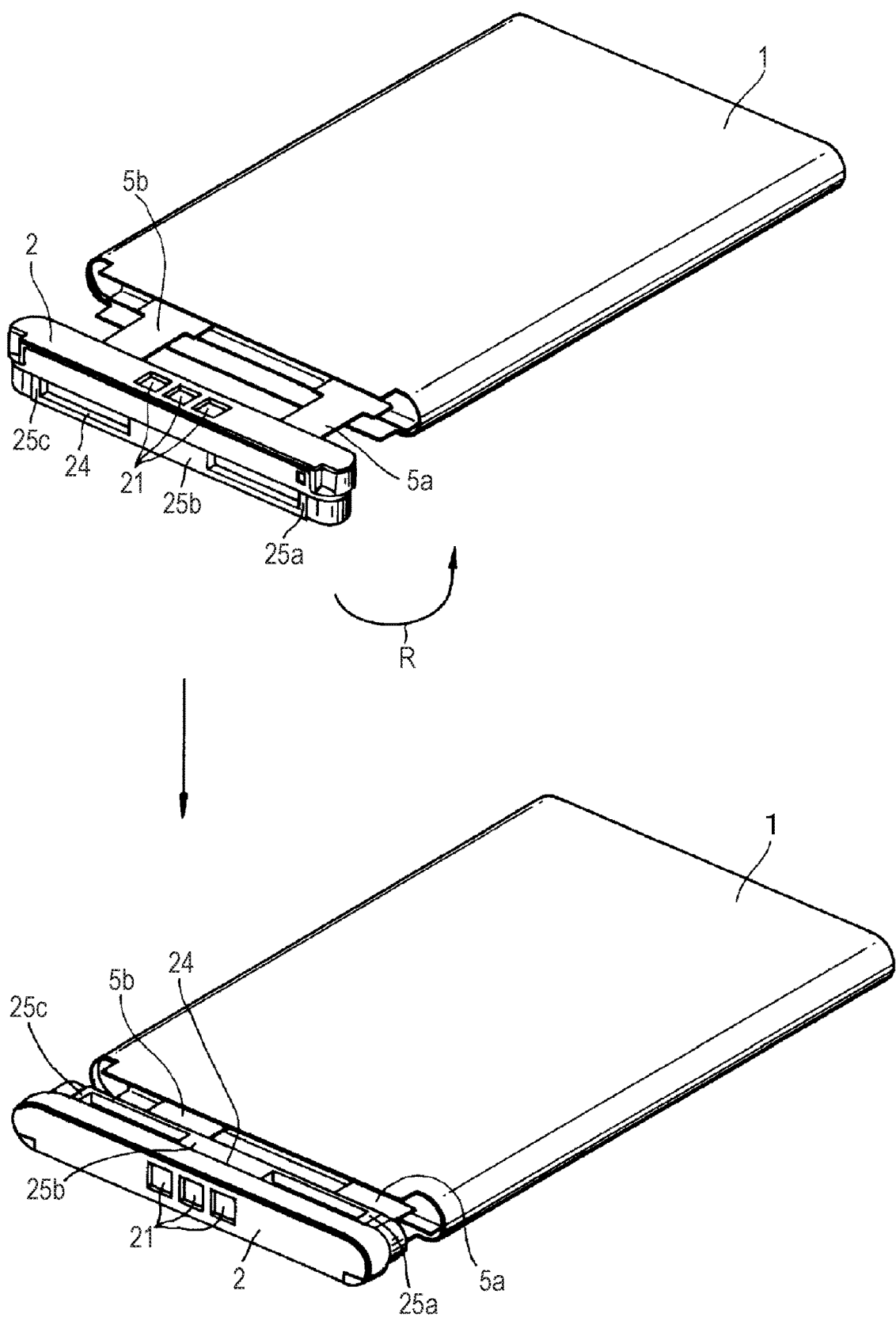
FIG. 14 is a perspective view illustrating the method of manufacturing a battery pack according to the second embodiment.

Next, as indicated by an arrow R of FIG. 14, the top cover 2 and the holder 24 engaged with each other are rotated by 90 degrees in a counterclockwise direction by hand or jig. As a result, the circuit board 22 which is located horizontally is located vertically. In this case, the circuit board 22 is sandwiched between the top cover 2 and the holder 24 and is not exposed to the outside, such that rotation can be made without touching the circuit board 22.

Figure 15:
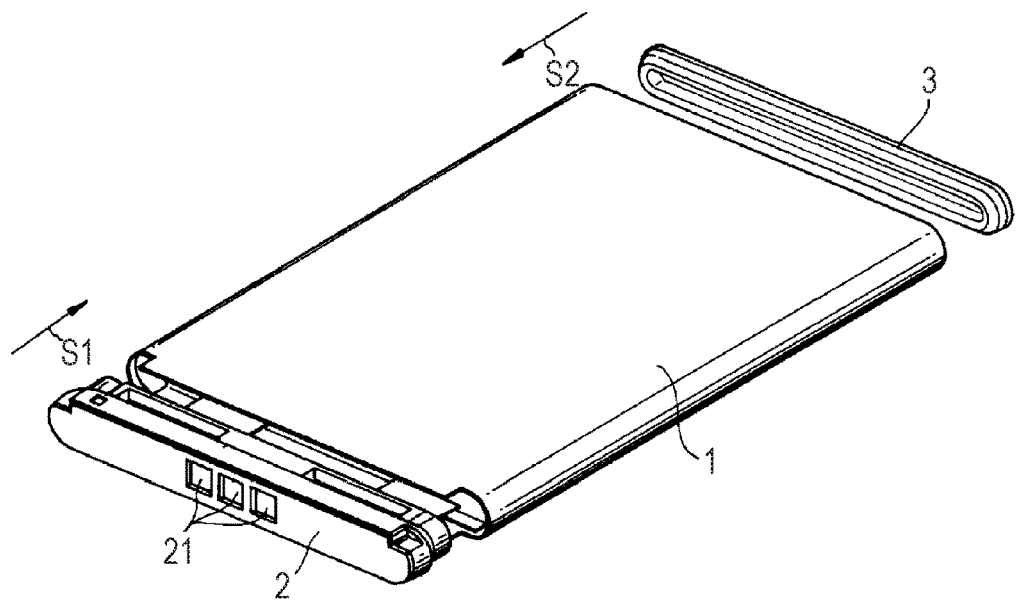
FIG. 15 is a perspective view illustrating the method of manufacturing a battery pack according to the second embodiment.

Next, as shown in FIG. 15, the top cover 2 and the holder 24 are pushed toward the top-side opening (in a direction of an arrow $S_1$) while bending the electrode leads 5a and 5b. Thus, the top cover 2 and the holder 24 are engaged with the top-side opening. As described above, the top cover 2 has a width slightly smaller than the inner dimension of the opening, so the top cover 2 and the holder 24 with the circuit board 22 sandwiched therebetween can be housed in a space defined by the hard laminate film 1b around the end surface of the external package 1.

<Bottom Cover Engagement Step>

Next, as shown in FIG. 15, the sidewall of the bottom cover 3 is pushed toward the opening of the bottom-side end surface of the external package 1 (in a direction of an arrow $S_2$). Thus, the sidewall of the bottom cover 3 is engaged with the bottom-side opening, and the bottom-side opening is covered with the main body of the bottom cover 3. The bottom cover 3 is a resin-molded product manufactured by, for example, separate injection molding or the like.

<Fusion-Bonding Step>

Next, fusion-bonding is performed over the entire length by a jig. That is, a heater block made of a metal, such as copper or the like, is pressed around the top-side end of the external package 1 vertically so as to fusion-bond the peripheral surface of the top cover 2 and the adhesive layer 16b as the inner surface of the hard laminate film 1b. Similarly, the heater block may be pressed around the bottom-side end of the external package 1 so as to fusion-bond the peripheral surface of the bottom cover 3 and the adhesive layer 16b as the inner surface of the hard laminate film 1b.

<Resin Injection Step>

Next, molten resin (hot melting material) is filled between the battery element 4 and the bottom cover 3 through a through hole (not shown) provided in the bottom cover 3 and solidified. Thus, the bottom cover 3 is adhered to the end surface of the battery element 4. The filled resin may be in a low-viscosity state at the time of molding. Though not particularly limited, a polyamide-based hot melt, a polyolefin-based hot melt, an acrylonitrile butadiene copolymer (ABS), or the like may be used.

Molten resin may be filled between the top cover 2 and the battery element 4. In this case, one or two through holes may be provided in the top cover 2, and molten resin may be injected from the through holes. With the above-described steps, the battery pack according to the second embodiment is manufactured.

In the battery pack according to the second embodiment, the same effects as in the first embodiment can be obtained.

3. Third Embodiment

Figure 16:
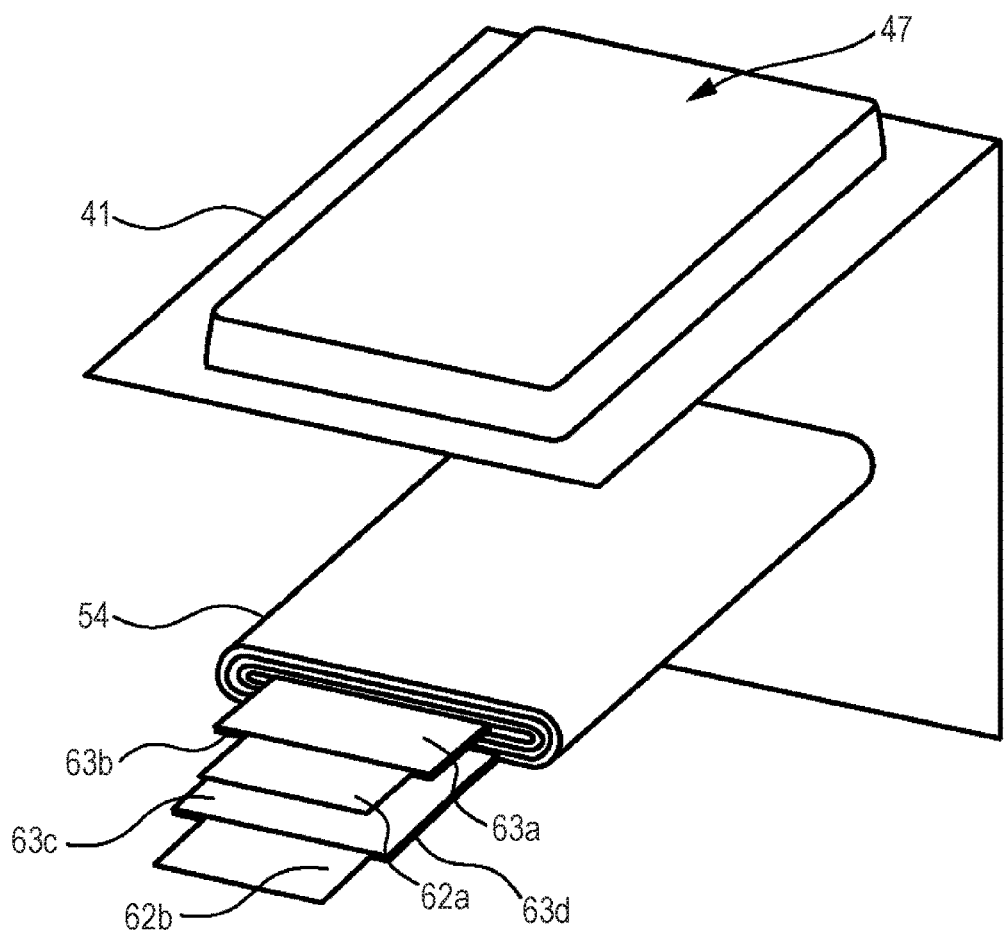
FIG. 16 is a perspective view showing the configuration of a nonaqueous electrolyte battery according to a third embodiment.
Figure 17:
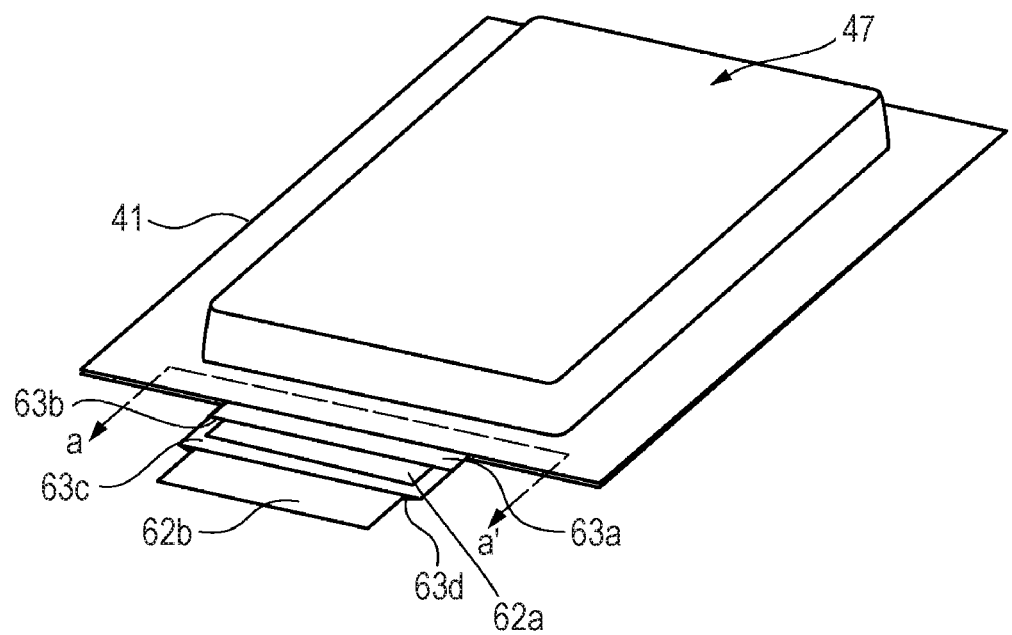
FIG. 17 is a perspective view showing the configuration of the nonaqueous electrolyte battery according to the third embodiment.

FIGS. 16 and 17 show the configuration of a nonaqueous electrolyte battery according to a third embodiment. As shown in FIGS. 16 and 17, the nonaqueous electrolyte battery has a battery element 54 which is housed in a concave portion 47 formed in a laminate film 41 and sealed by fusion-bonding three sides excluding a bent side on the periphery of the battery element 54 under reduced pressure.

As shown in FIG. 17, the nonaqueous electrolyte battery is configured such that a positive electrode lead 62a and a negative electrode lead 62b respective connected to a positive electrode and a negative electrode extend in the same direction from a seal portion of the laminate film 41 to the outside. The positive electrode lead 62a and the negative electrode lead 62b are suitably referred to as electrode leads when it is unnecessary to distinguish them.

<Battery Element 54>

A battery element 54 has, for example, an angular or flat shape, and is structured such that a band-shaped positive electrode and a band-shaped negative electrode are laminated through a polymer electrolyte and/or a separator and wound in the longitudinal direction. The positive electrode lead 62a made of, for example, aluminum (Al) or the like is connected to the positive electrode. The negative electrode lead 62b made of, for example, nickel (Ni) or the like is connected to the negative electrode.

The positive electrode lead 62a and the negative electrode lead 62b have a large width. The positive electrode lead 62a and the negative electrode lead 62b have the same width. The electrode leads having a large width are suitably used for a battery in which large-current discharge is performed. With the large width of the electrode leads, resistance when a large current flows can decrease and heat generated by the electrode leads can be reduced.

The positive electrode lead 62a and the negative electrode lead 62b preferably have a width equal to or larger than 50% of the width of the battery element 54. If the positive electrode lead 62a and the negative electrode lead 62b have a width less than 50% of the width of the battery element 54, resistance when a large current flows may increase, and defects may occur due to heat generation. The positive electrode lead 62a and the negative electrode lead 62b preferably have a width equal to or smaller than 95% of the battery width. If the positive electrode lead 62a and the negative electrode lead 62b have a width larger than 95% of the battery width, defects may easily occur at the seal portion.

The positive electrode lead 62a and the negative electrode lead 62b are different in length. Specifically, the positive electrode lead 62a has a length shorter than the length of the negative electrode lead 62b.

Sealant 63a to 63d are made of thermal adhesive resin materials containing adhesive resin and fine resin fibers described in the first embodiment.

The sealant 63a is arranged at a part of the surface of the positive electrode lead 62a facing the laminate film 41 so as to improve adhesion with the laminate film 41. The sealant 63b is arranged at a part of the surface of the positive electrode lead 62a facing the negative electrode lead 62b. The sealant 63a and the sealant 63b are bonded to each other.

The sealant 63d is arranged at a part of the surface of the negative electrode lead 62b facing the laminate film 41 so as to improve adhesion with the laminate film 41. The sealant 63c is arranged at a part of the surface of the negative electrode lead 62b facing the positive electrode lead 62a. The sealant 63c and the sealant 63d are bonded to each other. The sealant 63b and the sealant 63c are arranged so as to suppress occurrence of short-circuit because the positive electrode lead 62a and the negative electrode lead 62b come into direct contact with each other. The sealant 63b and the sealant 63c are bonded to each other.

Figure 18:
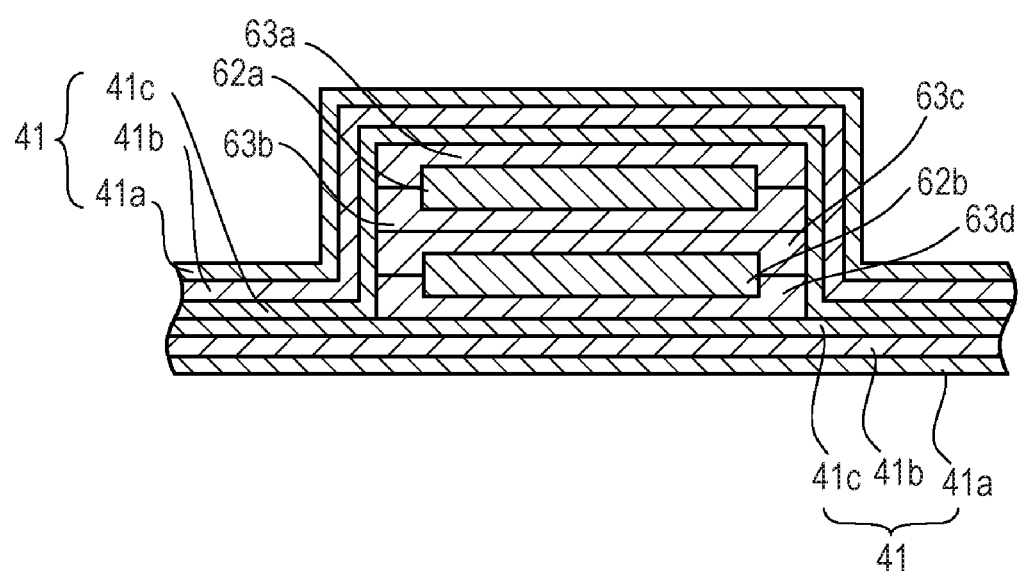
FIG. 18 is a sectional view taken along the line a-a' of FIG. 17.

FIG. 18 shows the sectional structure taken along the line a-a' of FIG. 17. As shown in FIG. 18, the positive electrode lead 62a and the negative electrode lead 62b having the same width are arranged such that one end thereof in the width direction are located at the same position as the other end thereof in the width direction. The sealant 63b and the sealant 63c are provided between the positive electrode lead 62a and the negative electrode lead 62b. Thus, the surface of the positive electrode lead 62a facing the negative electrode lead 62b and the surface of the negative electrode lead 62b facing the positive electrode lead 62a overlap each other through the sealant 63b and the sealant 63c in the thickness direction of the battery.

At a portion where the positive electrode lead 62a and the negative electrode lead 62b are not sandwiched between the upper and lower laminate films 41, the inner resin films 41c for bonding of the upper and lower laminate films 41 are opposite each other. At a portion where the positive electrode lead 62a and the negative electrode lead 62b are not sandwiched between the upper and lower laminate films 41, the inner resin films 41c for bonding of the upper and lower laminate films 41 are opposite each other through the sealants 63a to 63d.

At a portion where the positive electrode lead 62a and the negative electrode lead 62b are sandwiched between the upper and lower laminate films 41, the following structure is made: upper laminate film 41/sealant 63a/positive electrode lead 62a/sealant 63b/sealant 63c/negative electrode lead 62b/sealant 63d/lower laminate film 41. Specifically, the following structure is made: upper outer resin film 41a/ upper metal foil 41b/upper inner resin film 41c for bonding/ sealant 63a/positive electrode lead 62a/sealant 63b/sealant 63c/negative electrode lead 62b/sealant 63d/lower inner resin film 41c for bonding/lower metal foil 41b/lower outer resin film 41a.

The opposing inner resin films 41c for bonding are bonded to each other. At a portion where the inner resin films 41c for bonding are opposite each other through the sealants 63a to 63d, the opposing inner resin films 41c for bonding are bonded to each other.

The sealant 63a is bonded to the positive electrode lead 62a. The sealant 63a and the upper inner resin film 41c for bonding are bonded to each other. The upper inner resin film 41c for bonding is bonded to the positive electrode lead 62a through the sealant 63a.

The sealant 63d is bonded to the negative electrode lead 62b. The sealant 63d and the lower inner resin film 41c for bonding are bonded to each other. The lower inner resin film 41c for bonding is bonded to the negative electrode lead 62b through the sealant 63d. The sealant 63b and the sealant 63c are bonded to each other. The sealant 63b is bonded to the negative electrode lead 62b through the sealant 63c. The sealant 63c is bonded to the positive electrode lead 62a through the sealant 63b.

Figure 19A:
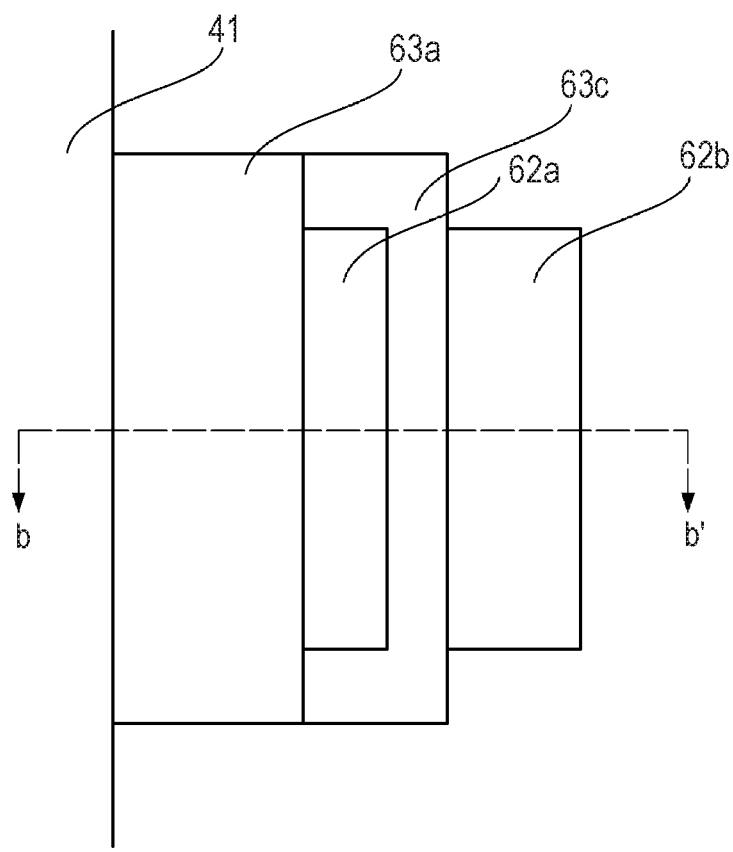
FIGS. 19A and 19B are schematic views illustrating an example of arrangement of electrode leads and sealants.
Figure 19B:
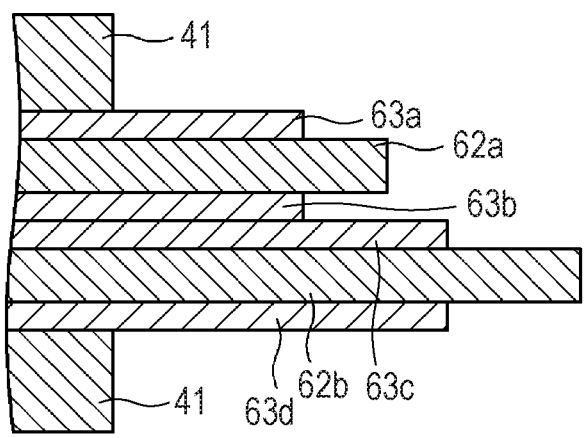

FIG. 19A is a top view illustrating the configuration of extended portions of the positive electrode lead 62a, the negative electrode lead 62b, and the sealants 63a to 63d extending from the laminate film 41. FIG. 19B is a sectional view taken along the line b-b' of FIG. 19A.

As shown in FIGS. 19A and 19B, the extended portions of the positive electrode lead 62a and the negative electrode lead 62b are different in length. That is, the extended portion of the positive electrode lead 62a is set to have a length shorter than the length of the extended portion of the negative electrode lead 62b.

The sealant 63a and the sealant 63b arranged on both surfaces of the positive electrode lead 62a have a width larger than the width of the positive electrode lead 62a. The extended portions of the sealant 63a and the sealant 63b are set to have a length smaller than the length of the extended portion of the positive electrode lead 62a. Thus, the surface of the positive electrode lead 62a facing the sealant 63a has a portion which is covered with the sealant 63a and a portion which is not covered with the sealant 63a. The surface of the positive electrode lead 62a facing the sealant 63b has a portion which is covered with the sealant 63b and a portion which is not covered with the sealant 63b.

The sealant 63c and the sealant 63d arranged on both surfaces of the negative electrode lead 62b have a width larger than the width of the negative electrode lead 62b. The extended portions of the sealant 63c and the sealant 63d are set to have a length smaller than the length of the extended portion of the negative electrode lead 62b and larger than the length of the extended portion of the positive electrode lead 62a. Thus, the surface of the negative electrode lead 62b facing the sealant 63c has a portion which is covered with the sealant 63c and a portion which is not covered with the sealant 63c. The surface of the negative electrode lead 62b facing the sealant 63d has a portion which is covered with the sealant 63d and a portion which is not covered with the sealant 63d. The portion of the negative electrode lead 62b which is not covered with the sealant 63c and the sealant 63d is located outside the positive electrode lead 62a.

At the surface of the positive electrode lead 62a facing the sealant 63b, a portion which is covered with the sealant 63b is opposite the negative electrode lead 62b through the sealant 63b and the sealant 63c. At the surface of the positive electrode lead 62a facing the sealant 63b, a portion which is not covered with the sealant 63b is opposite the negative electrode lead 62b through the sealant 63c. At the surface of the negative electrode lead 62b facing the sealant 63c, a portion which is not covered with the sealant 63c is located outside the positive electrode lead 62a. Thus, it is possible to suppress occurrence of short-circuit because the positive electrode lead 62a and the negative electrode lead 62b come into direct contact with each other. The positive electrode lead 62a has on both surfaces portions which are not covered with the sealant 63a and the sealant 63b, and the area of the exposed portion of the positive electrode lead 62a is larger than in a modification described below, which achieves a higher degree of freedom for a welding position.

Modification

First Example

Figure 20A:
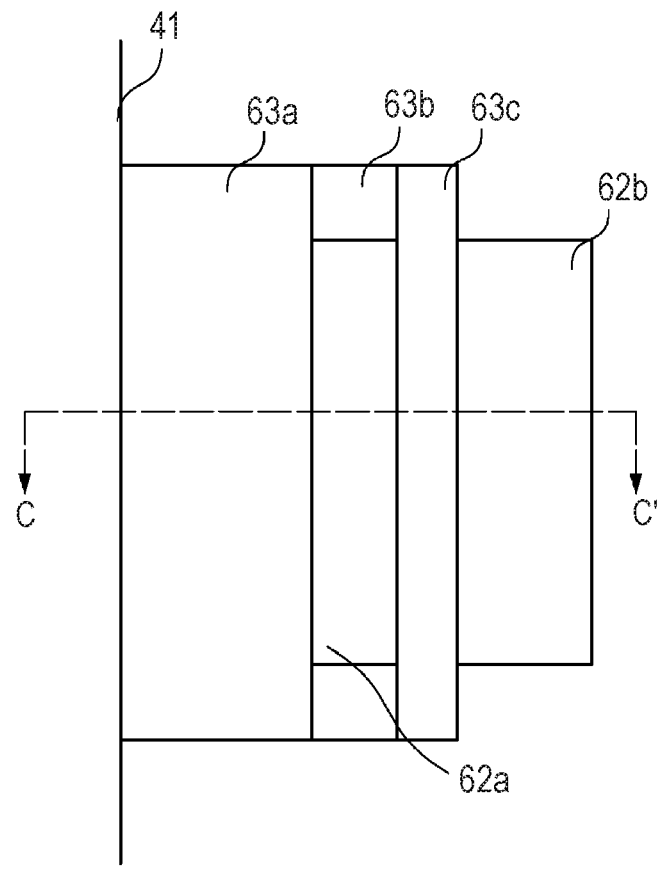
FIGS. 20A and 20B are schematic views illustrating an example of arrangement of electrode leads and sealants.
Figure 20B:
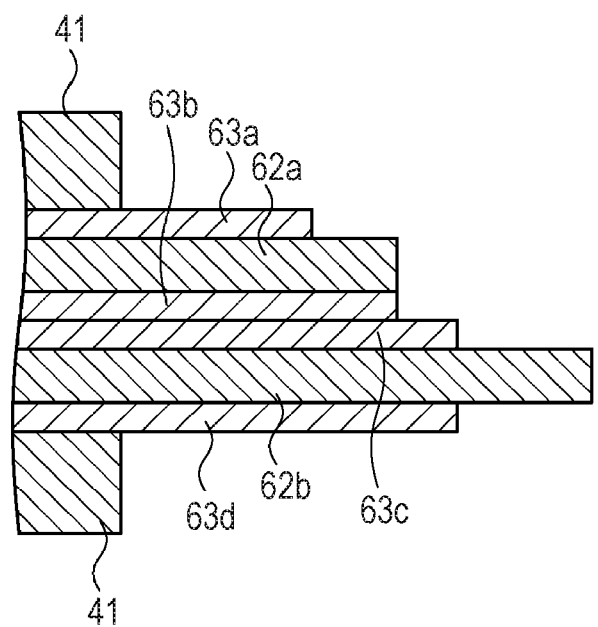

The extended portions of the positive electrode lead 62a, the negative electrode lead 62b, and the sealants 63a to 63d extending from the laminate film 41 may be configured as described below. First, another first example of the configuration of the extended portions of the positive electrode lead 62a, the negative electrode lead 62b, and the sealants 63a to 63d will be described. FIG. 20A is a top view illustrating another first example of the configuration of the extended portions of the positive electrode lead 62a, the negative electrode lead 62b, and the sealants 63a to 63d. FIG. 20B shows the sectional structure taken along the line c-c' of FIG. 20A.

As shown in FIGS. 20A and 20B, the extended portions of the positive electrode lead 62a and the negative electrode lead 62b are different in length. That is, the positive electrode lead 62a is set to have a length smaller than the length of the negative electrode lead 62b.

The sealant 63a and the sealant 63b arranged on both surfaces of the positive electrode lead 62a are set to have a width larger than the width of the positive electrode lead 62a. The extended portion of the sealant 63a is set to have a length smaller than the length of the extended portion of the positive electrode lead 62a. The extended portion of the sealant 63b is set to have the same length as the length of the extended portion of the positive electrode lead 62a. Thus, the surface of the positive electrode lead 62a facing the sealant 63a has a portion which is covered with the sealant 63a and a portion which is not covered with the sealant 63a. The surface of the positive electrode lead 62a facing the sealant 63b is entirely covered with the sealant 63b.

The sealant 63c and sealant 63d arranged on both surfaces of the negative electrode lead 62b are set to have a width larger than the width of the negative electrode lead 62b. The extended portions of the sealant 63c and the sealant 63d are set to have a length smaller than the length of the extended portion of the negative electrode lead 62b and larger than the length of the extended portion of the positive electrode lead 62a. Thus, the surface of the negative electrode lead 62b facing the sealant 63c has a portion which is covered with the sealant 63c and a portion which is not covered with the sealant 63c. The surface of the negative electrode lead 62b facing the sealant 63d has a portion which is covered with the sealant 63d and a portion which is not covered with the sealant 63d. The portion of the negative electrode lead 62b which is not covered with the sealant 63c and the sealant 63d is located outside the positive electrode lead 62a.

The surface of the positive electrode lead 62a facing the sealant 63b is opposite the negative electrode lead 62b through the sealant 63b and the sealant 63c. At the surface of the negative electrode lead 62b facing the sealant 63c, a portion which is not covered with the sealant 63c is located outside the positive electrode lead 62a. Thus, it is possible to suppress occurrence of short-circuit because the positive electrode lead 62a and the negative electrode lead 62b come into direct contact with each other. In the first example, the two sealants 63b and 63c are arranged over the entire region between the positive electrode lead 62a and the negative electrode lead 62b, so it is possible to suppress short-circuit more reliably.

Second Example

Figure 21A:
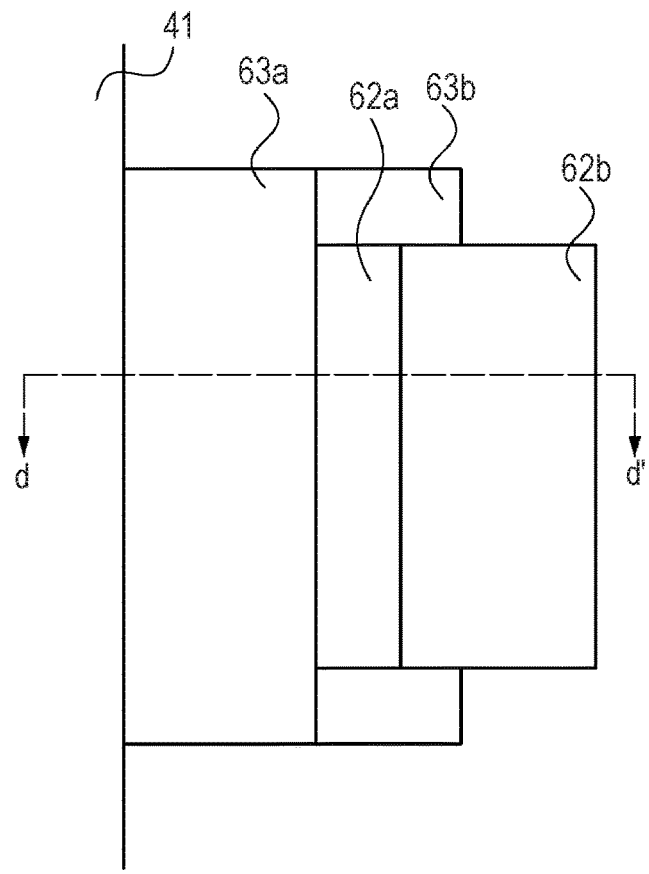
FIGS. 21A and 21B are schematic views illustrating an example of arrangement of electrode leads and sealants.
Figure 21B:
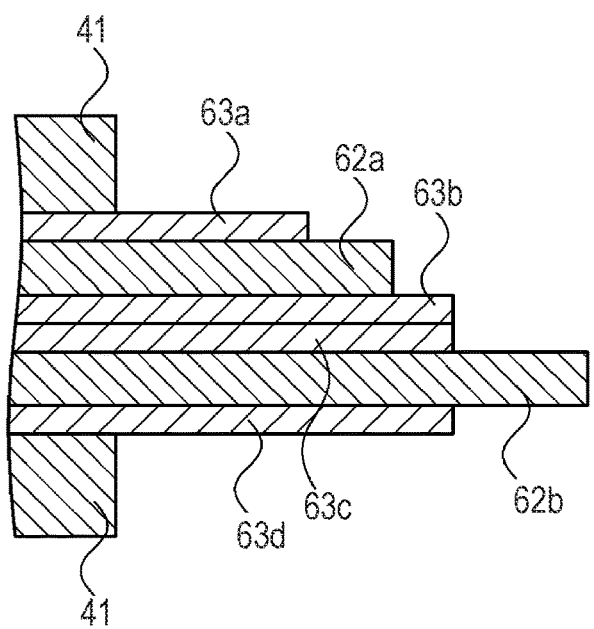

Next, another second example of the extended portions of the positive electrode lead 62a, the negative electrode lead 62b, and the sealants 63a to 63d will be described. FIG. 21A is a top view illustrating another second example of the extended portions of the positive electrode lead 62a, the negative electrode lead 62b, and the sealant 63. FIG. 21B shows the sectional view taken along the line d-d' of FIG. 21A. As shown in FIGS. 21A and 21B, the extended portions of the positive electrode lead 62a and the negative electrode lead 62b are different in length. That is, the positive electrode lead 62a is set to have a length smaller than the length of the negative electrode lead 62b.

The sealant 63a and the sealant 63b arranged on both surfaces of the positive electrode lead 62a are set to have a width larger than the width of the positive electrode lead 62a. The extended portion of the sealant 63a is set to have a length smaller than the length of the extended portion of the positive electrode lead 62a. The extended portion of the sealant 63b is set to have a length larger than the length of the extended portion of the positive electrode lead 62a. Thus, the surface of the positive electrode lead 62a facing the sealant 63a has a portion which is covered with the sealant 63a and a portion which is not covered with the sealant 63a. The surface of the positive electrode lead 62a facing the sealant 63b is entirely covered with the sealant 63b.

The sealant 63c and the sealant 63d arranged on both surfaces of the negative electrode lead 62b are set to have a width larger than the width of the negative electrode lead 62b. The extended portions of the sealant 63c and the sealant 63d are set to have a length smaller than the length of the extended portion of the negative electrode lead 62b and larger than the length of the extended portion of the positive electrode lead 62a. Thus, the surface of the negative electrode lead 62b facing the sealant 63c has a portion which is covered with the sealant 63c and a portion which is not covered with the sealant 63c. The surface of the negative electrode lead 62b facing the sealant 63d has a portion which is covered with the sealant 63d and a portion which is not covered with the sealant 63d. The portion of the negative electrode lead 62b which is not covered with the sealant 63c and the sealant 63d is located outside the positive electrode lead 62a.

The surface of the positive electrode lead 62a facing the sealant 63b is opposite the negative electrode lead 62b through the sealant 63b and the sealant 63c. At the surface of the negative electrode lead 62b facing the sealant 63c, a portion which is not covered with the sealant 63c is located outside the positive electrode lead 62a. Therefore, it is possible to suppress short-circuit because the positive electrode lead 62a and the negative electrode lead 62b come into direct contact with each other. In the second example, the two sealants 63b and 63c are arranged over the entire region between the positive electrode lead 62a and the negative electrode lead 62b, so it is possible to suppress short-circuit more reliably.

Effects

In the nonaqueous electrolyte battery according to the third embodiment, the positive electrode lead 62a and the negative electrode lead 62b overlap each other in the thickness direction of the battery through the sealants 63b and 63c, so good volume energy density can be obtained.

That is, when the positive electrode lead 62a and the negative electrode lead 62b having a large width are used, if the positive electrode lead 62a and the negative electrode lead 62b extend from the same side of the battery, short-circuit is likely to occur due to the use of the positive electrode lead 62a and the negative electrode lead 62b having a large width. Accordingly, in order to suppress short-circuit, for example, like the battery shown in FIG. 22, the positive electrode lead 62a and the negative electrode lead 62b extend from different sides. However, if the positive electrode lead 62a and the negative electrode lead 62b extend from different sides, it is necessary to seal two sides from which the positive electrode lead 62a and the negative electrode lead 62b extend, which causes degradation of volume efficiency.

Meanwhile, in the nonaqueous electrolyte battery according to the third embodiment, the positive electrode lead 62a and the negative electrode lead 62b extend from the same side of the battery. That is, the positive electrode lead 62a and the negative electrode lead 62b extend from a single side. Thus, the sealing area of the portions where the positive electrode lead 62a and the negative electrode lead 62b extend can be reduced, thereby improving the volume of the battery element 54. Therefore, energy density per volume can be improved as compared with the battery shown in FIG.

22. Further, the sealants 63b and 63c made of thermal adhesive resin materials containing thermal adhesive resin and fine resin fibers are arranged between the positive electrode lead 62a and the negative electrode lead 62b, so it is possible to suppress occurrence of short-circuit more reliably.

4. Fourth Embodiment

A fourth embodiment will be described. The fourth embodiment is the same as the third embodiment, except that the positive electrode lead 62a and the negative electrode lead 62b have different arrangement and configuration in the width direction. Thus, detailed description will hereinafter be made focusing on a difference from the third embodiment, and other description will not be repeated.

Figure 23A:
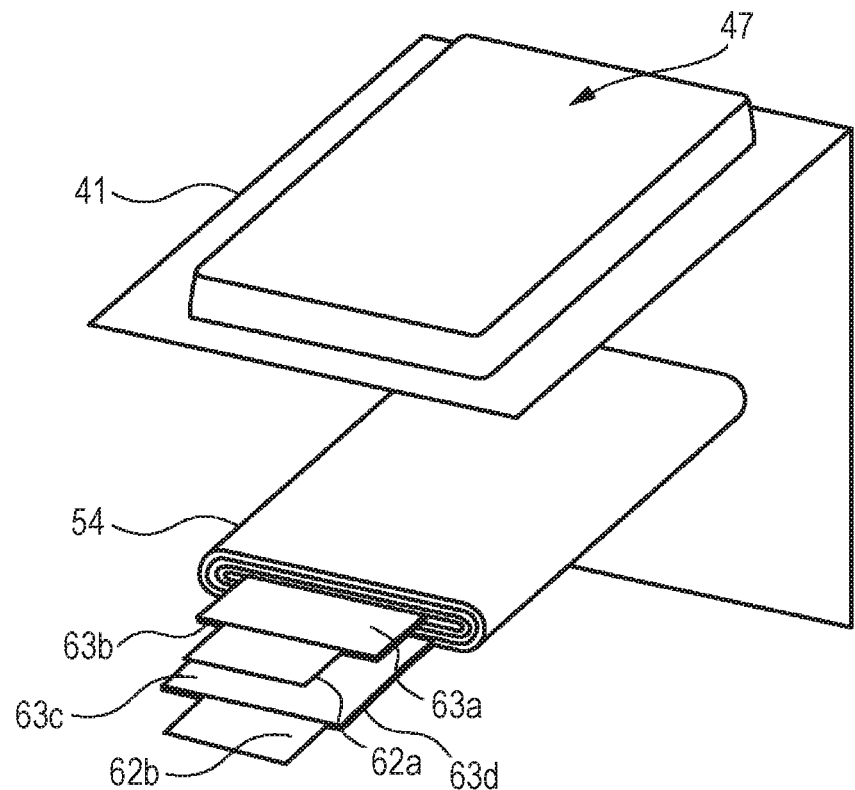
FIGS. 23A and 23B are perspective views showing the configuration of a nonaqueous electrolyte battery according to a fourth embodiment.
Figure 23B:
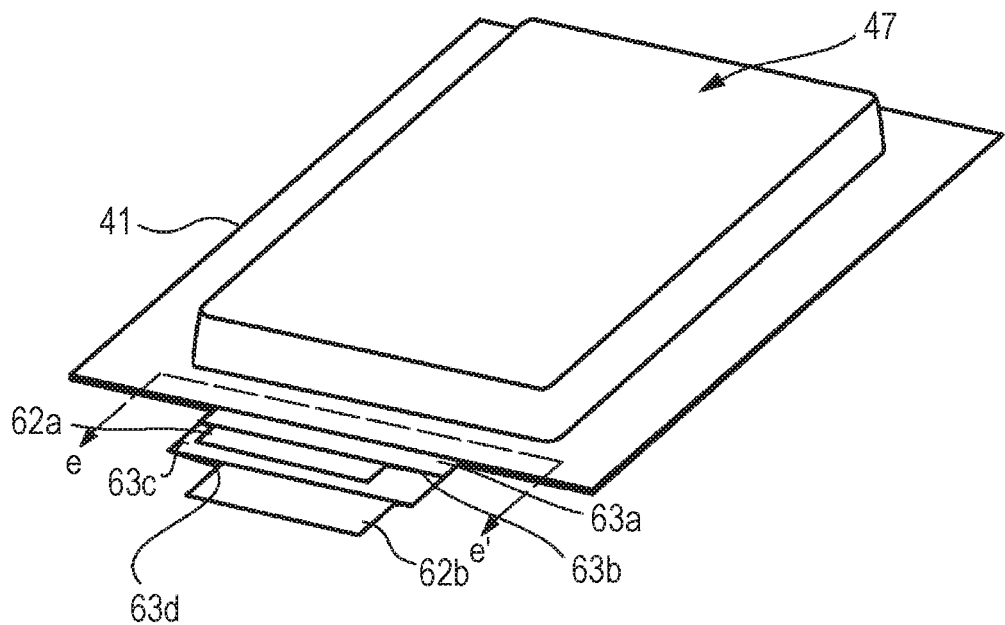

As shown in FIGS. 23A and 23B, the nonaqueous electrolyte battery has a battery element 54 which is housed in a concave portion 47 formed in a laminate film 41 and sealed by fusion-bonding three sides excluding a bent side on the periphery of the battery element 54 under reduced pressure. The nonaqueous electrolyte battery is configured such that a positive electrode lead 62a and a negative electrode lead 62b connected to the battery element 54 extend in the same direction from a seal portion of the laminate film 41 to the outside. The positive electrode lead 62a made of, for example, aluminum (Al) or the like is connected to the positive electrode of the battery element 54. The negative electrode lead 62b made of, for example, nickel (Ni) or the like is connected to the negative electrode of the battery element 54. The positive electrode lead 62a and the negative electrode lead 62b are set to have the same width.

Figure 24:
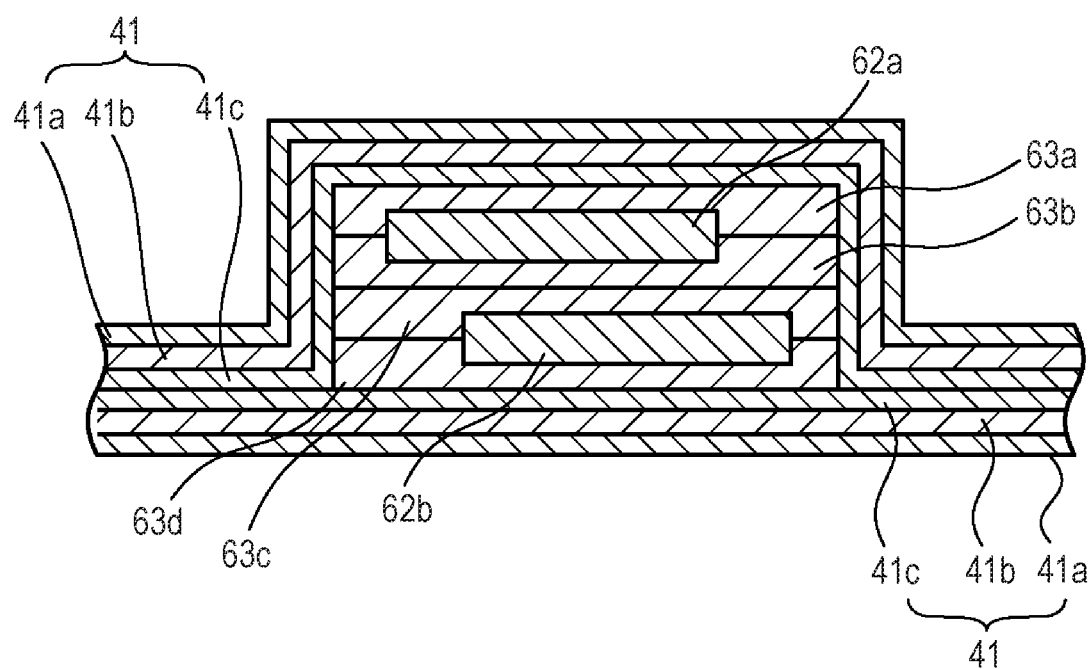
FIG. 24 is a sectional view taken along the line e-e' of FIG. 23B.

FIG. 24 shows the section taken along the line e-e' of FIG. 23B. As shown in FIG. 24, one end and the other end of the positive electrode lead 62a in the width direction and one end and the other end of the negative electrode lead 62b in the width direction are at different positions in the width direction. Specifically, one end of the positive electrode lead 62a in the width direction is located leftward from one end of the negative electrode lead 62b in the width direction, and the other end of the positive electrode lead 62a in the width direction exists between one end and the other end of the negative electrode lead 62b in the width direction. A sealant 63b and a sealant 63c are provided between the positive electrode lead 62a and the negative electrode lead 62b. Thus, a part of the surface of the positive electrode lead 62a facing the negative electrode lead 62b and a part of the surface of the negative electrode lead 62b facing the positive electrode lead 62a overlap each other in the thickness direction through the sealant 63b and the sealant 63c.

At a portion between the upper and lower laminate films 41 where the positive electrode lead 62a and the negative electrode lead 62b are not sandwiched, the inner resin films 41c for bonding of the upper and lower laminate films 41 are opposite each other. At a portion between the upper and lower laminate film 41 where the positive electrode lead 62a and the negative electrode lead 62b are not sandwiched, the inner resin films 41c for bonding of the upper and lower laminate films 41 are opposite each other through the sealants 63a to 63d.

At a portion between the upper and lower laminate films 41 where the positive electrode lead 62a and the negative electrode lead 62b are both sandwiched, the following structure is made: upper laminate film 41/sealant 63a/positive electrode lead 62a/sealant 63b/sealant 63c/negative electrode lead 62b/sealant 63d/lower laminate film 41. Specifically, the following structure is made: upper outer resin film 41a/upper metal foil 41b/upper inner resin film 41c for bonding/sealant 63a/positive electrode lead 62a/sealant 63b/sealant 63c/negative electrode lead 62b/sealant 63d/lower inner resin film 41c for bonding/lower metal foil 41b/lower outer resin film 41a.

At a portion between the upper and lower laminate films 41 where the positive electrode lead 62a is sandwiched, the following structure is made: upper laminate film 41/sealant 63a/positive electrode lead 62a/sealant 63b/sealant 63c/sealant 63d/lower laminate film 41. Specifically, the following structure is made: upper outer resin film 41a/upper metal foil 41b/upper inner resin film 41c for bonding/sealant 63a/positive electrode lead 62a/sealant 63b/sealant 63c/sealant 63d/lower inner resin film 41c for bonding/lower metal foil 41b/lower outer resin film 41a.

At a portion between the upper and lower laminate films 41 where the negative electrode lead 62b is sandwiched, the following structure is made: upper laminate film 41/sealant 63a/sealant 63b/sealant 63c/negative electrode lead 62b/sealant 63d/lower laminate film 41. Specifically, the following structure is made: upper outer resin film 41a/upper metal foil 41b/upper inner resin film 41c for bonding/sealant 63a/sealant 63b/sealant 63c/negative electrode lead 62b/sealant 63d/lower inner resin film 41c for bonding/lower metal foil 41b/lower outer resin film 41a.

The opposing inner resin films 41c for bonding are bonded to each other. At a portion where the inner resin films 41c for bonding are opposite each other through the sealants 63a to 63d, the opposing inner resin films 41c for bonding are bonded to each other through the sealants 63a to 63d which are bonded to each other.

The sealant 63a is bonded to the positive electrode lead 62a. The sealant 63a and the upper inner resin film 41c for bonding are bonded to each other. The upper inner resin film 41c for bonding is bonded to the positive electrode lead 62a through the sealant 63a.

The sealant 63d is bonded to the negative electrode lead 62b. The sealant 63d and the lower inner resin film 41c for bonding are bonded to each other. The lower inner resin film 41c for bonding is bonded to the negative electrode lead 62b through the sealant 63d.

The sealant 63b and the sealant 63c are bonded to each other. The sealant 63b is bonded to the negative electrode lead 62b through the sealant 63c. The sealant 63c is bonded to the positive electrode lead 62a through the sealant 63b.

Effects

The nonaqueous electrolyte battery according to the fourth embodiment have the same effects as in the third embodiment.

5. Fifth Embodiment

A fifth embodiment will be described. The fifth embodiment is the same as the third embodiment, except that the positive electrode lead 62a and the negative electrode lead 62b have different arrangement and configuration in the width direction. Thus, detailed description will hereinafter be made focusing on a difference from the third embodiment, and other description will not be repeated.

Figure 25A:
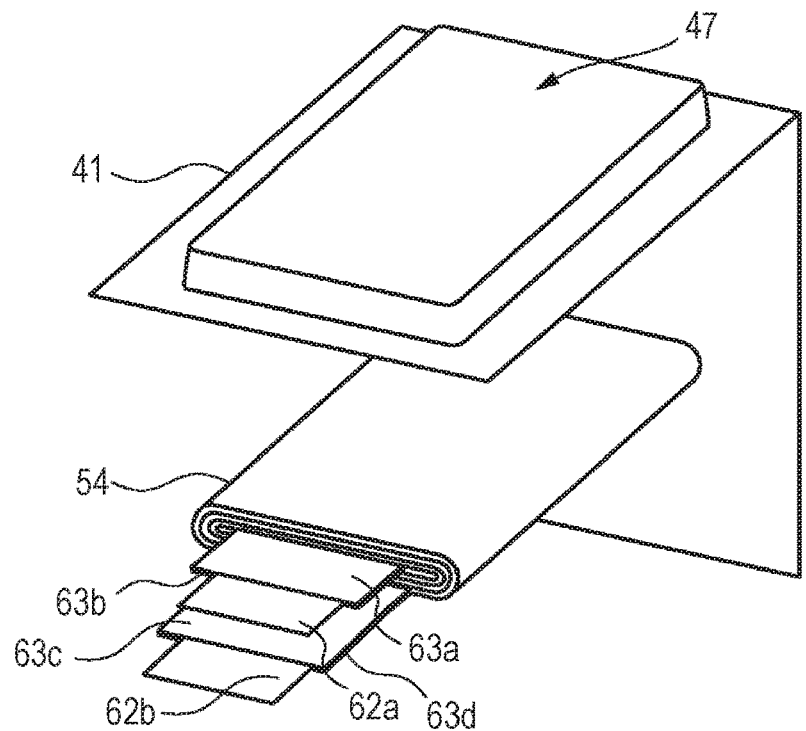
FIGS. 25A and 25B are perspective views showing the configuration of a nonaqueous electrolyte battery according to a fifth embodiment.
Figure 25B:
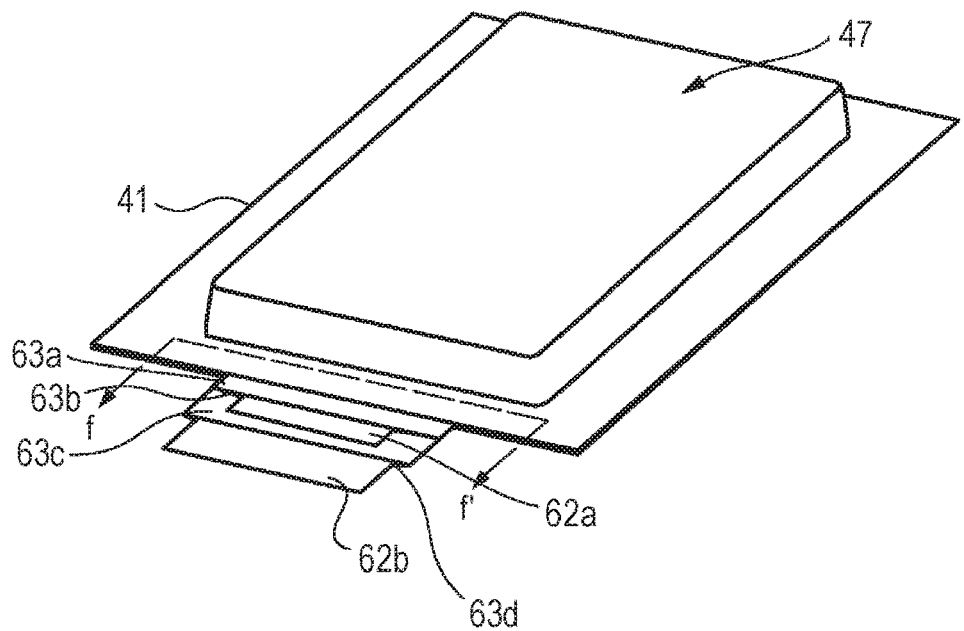

As shown in FIGS. 25A and 25B, the nonaqueous electrolyte battery has a battery element 54 which is housed in a concave portion 47 formed in a laminate film 41 and sealed by fusion-bonding three sides excluding a bent side on the periphery of the battery element 54 under reduced pressure.

The nonaqueous electrolyte battery is configured such that a positive electrode lead 62a and a negative electrode lead 62b connected to the battery element 54 extend in the same direction from a seal portion of the laminate film 41 to the outside. The positive electrode lead 62a made of, for example, aluminum (Al) or the like is connected to the positive electrode of the battery element 54. The negative electrode lead 62b made of, for example, nickel (Ni) or the like is connected to the negative electrode of the battery element 54. The negative electrode lead 62b is set to have a width larger than the width of the positive electrode lead 62a.

Figure 26:
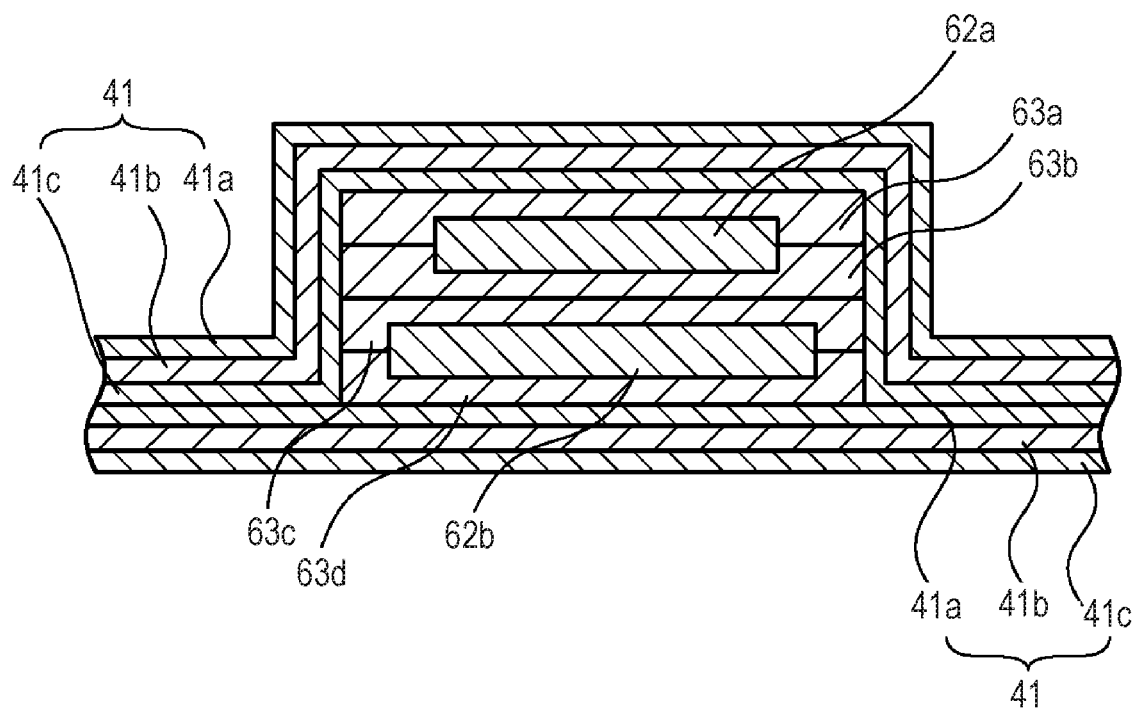
FIG. 26 is a sectional view taken along the line f-f of FIG. 25B.

FIG. 26 shows the sectional structure taken along the line f-f of FIG. 25B. As shown in FIG. 26, one end and the other end of the positive electrode lead 62a and the negative electrode lead 62b in the width direction are at different positions in the width direction. Specifically, one end and the other end of the positive electrode lead 62a in the width direction are located between one end and the other end of the negative electrode lead 62b in the width direction. A sealant 63b and a sealant 63c are provided between the positive electrode lead 62a and the negative electrode lead 62b. Thus, a part of the surface of the positive electrode lead 62a facing the negative electrode lead 62b and a part of the surface of the negative electrode lead 62b facing the positive electrode lead 62a overlap each other in the thickness direction of the battery through the sealant 63b and the sealants 63c.

In the example shown in FIG. 26, one end and the other end in the width direction of the negative electrode lead 62b where a variation occurs are located so as not to overlap the positive electrode lead 62a through the sealants 63b and 63c in the thickness direction of the battery. Therefore, when the negative electrode lead 62b is made of a material, such as nickel (Ni) or the like, having a large variation, it is possible to more effectively suppress short-circuit between the positive electrode lead 62a and the negative electrode lead 62b.

At a portion between the upper and lower laminate films 41 where the positive electrode lead 62a and the negative electrode lead 62b are not sandwiched, the inner resin films 41c for bonding of the upper and lower laminate films 41 are opposite each other. At a portion between the upper and lower laminate film 41 where the positive electrode lead 62a and the negative electrode lead 62b are not sandwiched, the inner resin films 41c for bonding of the upper and lower laminate films 41 are opposite each other through the sealants 63a to 63d.

At a portion between the upper and lower laminate films 41 where the positive electrode lead 62a and the negative electrode lead 62b are both sandwiched, the following structure is made: upper laminate film 41/sealant 63a/positive electrode lead 62a/sealant 63b/sealant 63c/negative electrode lead 62b/sealant 63d/lower laminate film 41. Specifically, the following structure is made: upper outer resin film 41a/upper metal foil 41b/upper inner resin film 41c for bonding/sealant 63a/positive electrode lead 62a/sealant 63b/sealant 63c/negative electrode lead 62b/sealant 63d/lower inner resin film 41c for bonding/lower metal foil 41b/lower outer resin film 41a.

At a portion between the upper and lower laminate films 41 where the negative electrode lead 62b is sandwiched, the following structure is made: upper laminate film 41/sealant 63a/sealant 63b/sealant 63c/negative electrode lead 62b/sealant 63d/lower laminate film 41. Specifically, the following structure is made: upper outer resin film 41a/upper metal foil 41b/upper inner resin film 41c for bonding/sealant 63a/sealant 63b/sealant 63c/negative electrode lead 62b/ sealant 63d/lower inner resin film 41c for bonding/lower metal foil 41b/lower outer resin film 41a.

The opposing inner resin films 41c for bonding are bonded to each other. At a portion where the inner resin films 41c for bonding are opposite each other through the sealants 63a to 63d, the opposing inner resin films 41c for bonding are bonded to each other through the sealants 63a to 63d which are bonded to each other.

The sealant 63a is bonded to the positive electrode lead 62a. The sealant 63a and the upper inner resin film 41c for bonding are bonded to each other. The upper inner resin film 41c for bonding is bonded to the positive electrode lead 62a through the sealant 63a.

The sealant 63d is bonded to the negative electrode lead 62b. The sealant 63d and the lower inner resin film 41c for bonding are bonded to each other. The lower inner resin film 41c for bonding is bonded to the negative electrode lead 62b through the sealant 63d.

The sealant 63b and the sealant 63c are bonded to each other. The sealant 63b is bonded to the negative electrode lead 62b through the sealant 63c. The sealant 63c is bonded to the positive electrode lead 62a through the sealant 63b.

Effects

The nonaqueous electrolyte battery according to the fifth embodiment has the same effects as in the third embodiment.

Examples

Test Example 1-1

A three-layered aluminum laminate film 41 of 10 cm×10 cm shown in FIG. 6 was manufactured for a test. Referring to the sectional structure shown in FIG. 6, the aluminum laminate film 41 was used in which the outer resin film 41a, the metal foil 41b, and the inner resin film 41c for bonding were configured as described below.

outer resin film 41a: PET film
metal foil 41b: aluminum foil
inner resin film 41c for bonding: unstretched polypropylene (CPP) in which 5 vol % of fine resin fibers are blended The inner resin film 41c for bonding was manufactured as follows. First, by melting unstretched polypropylene (CPP), adding fine resin fibers to the unstretched polypropylene (CPP), and stirring, a resin melt in which the fine resin fibers were blended uniformly was manufactured. The blended amount of the fine resin fibers was 5 vol % at a volume ratio with respect to the unstretched polypropylene (CPP). The resin melt was formed in a film shape by an inflation method, thereby obtaining the inner resin film 41c for bonding.

As the fine resin fibers, PET fibers having a diameter of 10 μm and a length of 500 μm were used. When being observed by an SEM, the diameter and length of the fine resin fibers were obtained by measuring the diameter and length for 30 fibers alternately selected and calculating the average.

The aluminum laminate film 41 was manufactured as follows. An adhesive was applied to both surfaces of the aluminum foil having a thickness of 50 μm, a PET film having a thickness of 20 μm was bonded to one surface of the aluminum foil, and an unstretched polypropylene film having a thickness of 30 μm with 5 vol % of fine resin fibers blended therein was bonded to the other surface of the aluminum foil. The thickness of the adhesive layer was 5 μm.

(Separation Strength Test)

A separation strength measurement was performed by using the aluminum laminate film 41 for a test. Two aluminum laminate films 41 were prepared and arranged such that the unstretched polypropylene films (CPP) were opposite to each other, and then fusion-bonding was performed. The bonding condition was the use of a metal seal head, upper/lower head 180° C., sealing pressure of 20 kgf/cm$^2$, and a sealing time of 5 seconds.

A fusion-bonded test piece having a width of 15 mm was cut and pulled out in the length direction, and separation strength was measured. In this case, a PET adhesive tape was bonded to both surfaces so as not to cause resin to be stretched. The separation condition was 180° separation and a separation speed of 50 mm/min.

(Cleaving Pressure Measurement)

A battery having the configuration shown in FIG. 3 was manufactured by using the aluminum laminate film 41 for a test. As the 8 mm×10 mm sealants 43a and 43b having a thickness of 50 μm covering the electrode leads 42 (aluminum tab leads having a width of 5 mm), a material in which 5 vol % of the PET fibers as fine resin fibers were blended with unstretched polypropylene (CPP) was used.

The sealants 43a and 43b were manufactured as described below. First, by melting the unstretched polypropylene (CPP), adding the fine resin fibers to the unstretched polypropylene (CPP), and stirring, a resin melt in which the fine resin fibers were uniformly blended was manufactured. The blended amount of the fine resin fibers was the amount corresponding to 5 vol % at a volume ratio with respect to the unstretched polypropylene (CPP). The resin melt was manufactured in a film shape by an inflation method and cut at a predetermined dimension, thereby obtaining the sealants 43a and 43b.

A battery was configured such that a dummy element was used as the battery element 4, the dummy element was covered with the aluminum laminate film 41, and four sides on the periphery of the dummy element were sealed. The sealing condition of the laminate film was the use of a metal head having a width of 1 mm, upper/lower 180°, sealing pressure of 20 kgf/cm$^2$, and a sealing time of 5 seconds. Next, compressed air was injected from the dummy element, and pressure when the seal portion was swollen and cleaved was measured.

(Molding Property Evaluation)

Deep drawing processing was performed for the aluminum laminate film 41 by using a mold of a rectangle ratio 40 mm×60 mm. The molding speed was 100 mm/min. The molding property was evaluated by measuring the minimum depth which a pinhole or crack occurs in the metal foil 41b.

(Short-Circuit Confirmation)

A battery having the configuration shown in FIG. 3 was manufactured by using the aluminum laminate film 41 for a test. In this case, the 8 mm×10 mm sealants 43a and 43b having a thickness of 50 μm were used. The sealants 43a and 43b were made of a material in which PET fibers having a diameter of 10 μm and a length of 500 μm were blended with unstretched polypropylene (CPP). Sealing was performed for 30 seconds under the conditions of sealing pressure of 30 kgf/cm$^2$ and sealing temperature of 200° C., and it was confirmed that short-circuit occurred for 30 seconds.

Test Example 1-2

As the inner resin film 41c for bonding of the aluminum laminate film 41 and the sealants 43a and 43b, unstretched polypropylene in which 10 vol % of fine resin fibers were blended was used. Others were the same as in Test Example 1-1 and the tests (1) to (4) were conducted.

Test Example 1-3

As the inner resin film 41c for bonding of the aluminum laminate film 41 and the sealants 43a and 43b, unstretched polypropylene (CPP) in which 15 vol % of fine resin fibers were blended was used. Others were the same as in Test Example 1-1, the tests (1) to (4) were conducted.

Test Example 1-4

As the inner resin film 41c for bonding of the aluminum laminate film 41 and the sealants 43a and 43b, unstretched polypropylene (CPP) in which 20 vol % of fine resin fibers were blended was used. Others were the same as in Test Example 1-1, and the tests (1) to (4) were conducted.

Test Example 1-5

As the inner resin film 41c for bonding of the aluminum laminate film 41 and the sealants 43a and 43b, unstretched polypropylene (CPP) in which 25 vol % of fine resin fibers were blended was used. Others were the same as in Test Example 1-1, and the tests (1) to (4) were conducted.

Test Example 1-6

As the inner resin film 41c for bonding of the aluminum laminate film 41 and the sealants 43a and 43b, unstretched polypropylene (CPP) in which 30 vol % of fine resin fibers were blended was used. Others were the same as in Test Example 1-1, and the tests (1) to (4) were conducted.

Test Example 1-7

As the inner resin film 41c for bonding of the aluminum laminate film 41 and the sealants 43a and 43b, unstretched polypropylene (CPP) in which 40 vol % of fine resin fibers were blended was used. Others were the same as in Test Example 1-1, and the tests (1) to (4) were conducted.

Test Example 1-8

As the inner resin film 41c for bonding of the aluminum laminate film 41 and the sealants 43a and 43b, unstretched polypropylene (CPP) in which 50 vol % of fine resin fibers were blended was used. Others were the same as in Test Example 1-1, and the tests (1) to (4) were conducted.

Test Example 1-9

As the inner resin film 41c for bonding of the aluminum laminate film 41 and the sealants 43a and 43b, unstretched polypropylene (CPP) in which 60 vol % of fine resin fibers were blended was used. Others were the same as in Test Example 1-1, and the tests (1) to (4) were conducted.

<Test Example 1-10> (for Comparison)

As the inner resin film 41c for bonding of the aluminum laminate film 41 and the sealants 43a and 43b, unstretched polypropylene (CPP) in which no fine resin fibers were blended was used. Others were the same as in Test Example 1-1, and the tests (1) to (4) were conducted.

Table 1 shows the test results of Test Example 1-1 to Test Example 1-10. As the result of the separation strength test, a value equal to or larger than 25 N/15 mm is desirable. As the result of the cleaving pressure measurement, a value equal to or larger than 0.35 Pa is desirable. As the result of the molding property evaluation, a value equal to or larger than 5.80 mm is desirable.

TABLE 1

|  | Additive amount [vol %] | Seal strength [N/15 mm] | Cleaving pressure measurement [Mpa] | Molding property [mm] | Short-circuit confirmation |
|---|---|---|---|---|---|
| Test Example 1-1 | 5 | 33.2 | 0.44 | 6.17 | short-circuit |
| Test Example 1-2 | 10 | 32.7 | 0.44 | 6.17 | no short-circuit |
| Test Example 1-3 | 15 | 33.0 | 0.42 | 6.13 | no short-circuit |
| Test Example 1-4 | 20 | 32.3 | 0.40 | 6.09 | no short-circuit |
| Test Example 1-5 | 25 | 32.2 | 0.41 | 6.00 | no short-circuit |
| Test Example 1-6 | 30 | 31.8 | 0.41 | 6.03 | no short-circuit |
| Test Example 1-7 | 40 | 23.0 | 0.32 | 5.55 | no short-circuit |
| Test Example 1-8 | 50 | 19.5 | 0.21 | 4.46 | no short-circuit |
| Test Example 1-9 | 60 | 12.2 | 0.16 | 3.57 | no short-circuit |
| Test Example 1-10 | 0 | 32.1 | 0.41 | 6.20 | short-circuit |

As shown in Table 1, according to Test Example 1-1 to Test Example 1-10, the following was confirmed. By using the aluminum laminate film 41 made of unstretched polypropylene (CPP), in which fine resin fibers are blended, as the inner resin film 41c for bonding, and forming the sealants 43a and 43b of unstretched polypropylene (CPP) in which fine resin fibers are blended, short-circuit was suppressed. Further, according to Test Example 1-1 to Test Example 1-10, short-circuit was suppressed in a predetermined blended amount without affecting adhesion or sealing properties.

Test Example 2-1

Similarly to Test Example 1-3, the tests (1) to (4) were conducted.

Test Example 2-2

As the inner resin film 41c for bonding of the aluminum laminate film 41 and the sealants 43a and 43b, unstretched polypropylene (CPP) in which 15 vol % of polybutylene terephthalate (PBT) as fine resin fiber were blended was used. Others were the same as in Test Example 2-1, and the tests (1) to (4) were conducted.

Test Example 2-3

As the inner resin film 41c for bonding of the aluminum laminate film 41 and the sealants 43a and 43b, unstretched polypropylene (CPP) in which 15 vol % of 6,6-nylon as fine resin fibers was blended was used. Others were the same as in Test Example 2-1, and the tests (1) to (4) were conducted.

Test Example 2-4

As the inner resin film 41c for bonding of the aluminum laminate film 41 and the sealants 43a and 43b, unstretched polypropylene (CPP) in which 15 vol % of aramid [Nomex (Registered Trademark)] as fine resin fibers was used. Others were the same as in Test Example 2-1, and the tests (1) to (4) were conducted.

Test Example 2-5

As the inner resin film 41c for bonding of the aluminum laminate film 41 and the sealants 43a and 43b, unstretched polypropylene (CPP) in which 15 vol % of polycarbonate (PC) as fine resin fibers was blended was used. Others were the same as in Test Example 2-1, and the tests (1) to (4) were conducted.

Test Example 2-6

As the inner resin film 41c for bonding of the aluminum laminate film 41 and the sealants 43a and 43b, unstretched polypropylene (CPP) in which 15 vol % of polyimide (PI) as fine resin fibers was blended was used. Others were the same as in Test Example 2-1, and the tests (1) to (4) were conducted.

Test Example 2-7

As the inner resin film 41c for bonding of the aluminum laminate film 41 and the sealants 43a and 43b, unstretched polypropylene (CPP) in which 15 vol % of polyphenylene sulfone (PPS) as fine resin fibers was blended was used. Others were the same as in Test Example 2-1, and the tests (1) to (4) were conducted.

Test Example 2-8

As the inner resin film 41c for bonding of the aluminum laminate film 41 and the sealants 43a and 43b, unstretched polypropylene (CPP) in which 15 vol % of polytetrafluoroethylene (PTFE) as fine resin fibers was blended was used. Others were the same as in Test Example 2-1, and the tests (1) to (4) were conducted.

Table 2 shows the results of Test Example 2-1 to Test Example 2-8 and Test Example 1-10 (for comparison).

TABLE 2

|  | Fine resin fiber material | Seal strength [N/15 mm] | Cleaving pressure measurement [Mpa] | Molding property [mm] | Short-circuit confirmation |
|---|---|---|---|---|---|
| Test Example 1-10 | — | 32.1 | 0.41 | 6.20 | short-circuit |
| Test Example 2-1 | PET | 33.0 | 0.42 | 6.13 | no short-circuit |
| Test Example 2-2 | PBT | 33.1 | 0.41 | 6.15 | no short-circuit |
| Test Example 2-3 | 6,6-Nylon | 32.4 | 0.42 | 6.10 | no short-circuit |
| Test Example 2-4 | Aramid (Nomex) | 31.8 | 0.43 | 5.91 | no short-circuit |
| Test Example 2-5 | PC | 31.8 | 0.43 | 6.02 | no short-circuit |

TABLE 2-continued

|  | Fine resin fiber material | Seal strength [N/15 mm] | Cleaving pressure measurement [Mpa] | Molding property [mm] | Short-circuit confirmation |
|---|---|---|---|---|---|
| Test Example 2-6 | PI | 31.6 | 0.40 | 5.99 | no short-circuit |
| Test Example 2-7 | PPS | 32.2 | 0.39 | 6.13 | no short-circuit |
| Test Example 2-8 | PTFE | 33.5 | 0.37 | 6.19 | no short-circuit |

As shown in Table 2, according to Test Example 2-1 to Test Example 2-8 and Test Example 1-10, it was confirmed that short-circuit could be suppressed regardless of the kind of the material for the fine resin fibers without affecting adhesion or sealing properties.

Test Example 3-1

As the inner resin film 41c for bonding of the aluminum laminate film 41 and the sealants 43a and 43b, unstretched polypropylene (CPP) in which 15 vol % of PET fibers having a diameter of 0.3 µm and a length of 5000 µm as fine resin fibers were blended was used. Others were the same as in Test Example 1-1, and the tests (1) to (4) were conducted.

Test Example 3-2

As the inner resin film 41c for bonding of the aluminum laminate film 41 and the sealants 43a and 43b, unstretched polypropylene (CPP) in which 15 vol % of PET fibers having a diameter of 0.5 µm and a length of 200 µm as fine resin fibers were blended was used. Others were the same as in Test Example 1-1, and the tests (1) to (4) were conducted.

Test Example 3-3

As the inner resin film 41c for bonding of the aluminum laminate film 41 and the sealants 43a and 43b, unstretched polypropylene (CPP) in which 15 vol % of PET fibers having a diameter of 0.5 µm and a length of 500 µm as fine resin fibers were blended was used. Others were the same as in Test Example 1-1, and the tests (1) to (4) were conducted.

Test Example 3-4

As the inner resin film 41c for bonding of the aluminum laminate film 41 and the sealants 43a and 43b, unstretched polypropylene (CPP) in which 15 vol % of PET fibers having a diameter of 0.5 µm and a length of 2000 µm as fine resin fibers were blended was used. Others were the same as in Test Example 1-1, and the tests (1) to (4) were conducted.

Test Example 3-5

As the inner resin film 41c for bonding of the aluminum laminate film 41 and the sealants 43a and 43b, unstretched polypropylene (CPP) in which 15 vol % of PET fibers having a diameter of 0.5 µm and a length 5000 µm as fine resin fibers were blended was used. Others were the same as in Test Example 1-1, and the tests (1) to (4) were conducted.

Test Example 3-6

As the inner resin film 41c for bonding of the aluminum laminate film 41 and the sealants 43a and 43b, unstretched polypropylene (CPP) in which 15 vol % of PET fibers having a diameter of 5 µm and a length of 120 µm as fine resin fibers were blended was used. Others were the same as in Test Example 1-1, and the tests (1) to (4) were conducted.

Test Example 3-7

As the inner resin film 41c for bonding of the aluminum laminate film 41 and the sealants 43a and 43b, unstretched polypropylene (CPP) in which 15 vol % of PET fibers having a diameter of 5 µm and a length of 200 µm as fine resin fibers were blended was used. Others were the same as in Test Example 1-1, and the tests (1) to (4) were conducted.

Test Example 3-8

As the inner resin film 41c for bonding of the aluminum laminate film 41 and the sealants 43a and 43b, unstretched polypropylene (CPP) in which 15 vol % of PET fibers having a diameter of 5 µm and a length of 500 µm as fine resin fibers were blended was used. Others were the same as in Test Example 3-1, and the tests (1) to (4) were conducted.

Test Example 3-9

As the inner resin film 41c for bonding of the aluminum laminate film 41 and the sealants 43a and 43b, unstretched polypropylene (CPP) in which 15 vol % of PET fibers having a diameter of 5 µm and a length of 2000 µm as fine resin fibers were blended was used. Others were the same as in Test Example 3-1, and the tests (1) to (4) were conducted.

Test Example 3-10

As the inner resin film 41c for bonding of the aluminum laminate film 41 and the sealants 43a and 43b, unstretched polypropylene (CPP) in which 15 vol % of PET fibers having a diameter of 5 µm and a length of 5000 µm as fine resin fibers were blended was used. Others were the same as in Test Example 1-1, and the tests (1) to (4) were conducted.

Test Example 3-11

As the inner resin film 41c for bonding of the aluminum laminate film 41 and the sealants 43a and 43b, unstretched polypropylene (CPP) in which 15 vol % of PET fibers having a diameter of 5 µm and a length of 7000 µm as fine resin fibers were blended was used. Others were the same as in Test Example 1-1, and the tests (1) to (4) were conducted.

Test Example 3-12

As the inner resin film 41c for bonding of the aluminum laminate film 41 and the sealants 43a and 43b, unstretched polypropylene (CPP) in which 15 vol % of PET fibers having a diameter of 10 µm and a length of 200 µm as fine resin fibers were blended was used. Others were the same as in Test Example 3-1, and the tests (1) to (4) were conducted.

Test Example 3-13

As the inner resin film 41c for bonding of the aluminum laminate film 41 and the sealants 43a and 43b, unstretched polypropylene (CPP) in which 15 vol % of PET fibers having a diameter of 10 μm and a length of 500 μm as fine resin fibers were blended was used. Others were the same as in Test Example 3-1, and the tests (1) to (4) were conducted.

Test Example 3-14

As the inner resin film 41c for bonding of the aluminum laminate film 41 and the sealants 43a and 43b, unstretched polypropylene (CPP) in which 15 vol % of PET fibers having a diameter of 10 μm and a length of 2000 μm as fine resin fibers were blended was used. Others were the same as in Test Example 3-1, and the tests (1) to (4) were conducted.

Test Example 3-15

As the inner resin film 41c for bonding of the aluminum laminate film 41 and the sealants 43a and 43b, unstretched polypropylene (CPP) in which 15 vol % of PET fibers having a diameter of 10 μm and a length of 5000 μm as fine resin fibers were blended was used. Others were the same as in Test Example 1-1, and the tests (1) to (4) were conducted.

Test Example 3-16

As the inner resin film 41c for bonding of the aluminum laminate film 41 and the sealants 43a and 43b, unstretched polypropylene (CPP) in which 15 vol % of PET fibers having a diameter of 20 μm and a length of 200 μm as fine resin fibers were blended was used. Others were the same as in Test Example 3-1, and the tests (1) to (4) were conducted.

Test Example 3-17

As the inner resin film 41c for bonding of the aluminum laminate film 41 and the sealants 43a and 43b, unstretched polypropylene (CPP) in which 15 vol % of PET fibers having a diameter of 20 μm and a length of 500 μm as fine resin fibers were blended was used. Others were the same as in Test Example 3-1, and the tests (1) to (4) were conducted.

Test Example 3-18

As the inner resin film 41c for bonding of the aluminum laminate film 41 and the sealants 43a and 43b, unstretched polypropylene (CPP) in which 15 vol % of PET fibers having a diameter of 20 μm and a length of 2000 μm as fine resin fibers were blended was used. Others were the same as in Test Example 3-1, and the tests (1) to (4) were conducted.

Test Example 3-19

As the inner resin film 41c for bonding of the aluminum laminate film 41 and the sealants 43a and 43b, unstretched polypropylene (CPP) in which 15 vol % of PET fibers having a diameter of 20 μm and a length of 5000 μm as fine resin fibers were blended was used. Others were the same as in Test Example 1-1, and the tests (1) to (4) were conducted.

Test Example 3-20

As the inner resin film 41c for bonding of the aluminum laminate film 41 and the sealants 43a and 43b, unstretched polypropylene (CPP) in which 15 vol % of PET fibers having a diameter of 25 μm and a length of 5000 μm as fine resin fibers were blended was used. Others were the same as in Test Example 1-1, and the tests (1) to (4) were conducted.

Table 3 shows the results of Test Example 3-1 to Test Example 3-20 and Test Example 1-10 (for comparison).

TABLE 3

| | Diameter [μm] | Length [μm] | Seal strength [N/15 mm] | Cleaving pressure measurement [Mpa] | Molding property [mm] | Short-circuit confirmation | Note |
|---|---|---|---|---|---|---|---|
| Test Example 1-10 | — | — | 32.1 | 0.41 | 6.20 | short-circuit | — |
| Test Example 3-1 | 0.3 | 5000 | 32.2 | 0.40 | 6.18 | short-circuit | — |
| Test Example 3-2 | 0.5 | 200 | 32.0 | 0.39 | 6.23 | no short-circuit | — |
| Test Example 3-3 | 0.5 | 500 | 32.2 | 0.38 | 6.23 | no short-circuit | — |
| Test Example 3-4 | 0.5 | 2000 | 32.1 | 0.40 | 6.22 | no short-circuit | — |
| Test Example 3-5 | 0.5 | 5000 | 32.4 | 0.41 | 6.09 | no short-circuit | — |
| Test Example 3-6 | 5 | 120 | 31.0 | 0.38 | 6.21 | short-circuit | — |
| Test Example 3-7 | 5 | 200 | 29.4 | 0.36 | 6.26 | no short-circuit | — |
| Test Example 3-8 | 5 | 500 | 32.1 | 0.40 | 6.20 | no short-circuit | — |
| Test Example 3-9 | 5 | 2000 | 32.1 | 0.40 | 5.98 | no short-circuit | — |
| Test Example 3-10 | 5 | 5000 | 31.8 | 0.42 | 5.92 | no short-circuit | — |
| Test Example 3-11 | 5 | 7000 | 32.2 | 0.43 | 5.77 | no short-circuit | Fine resin fiber flies over film surface |
| Test Example 3-12 | 10 | 200 | 30.2 | 0.38 | 6.25 | no short-circuit | — |
| Test Example 3-13 | 10 | 500 | 33.0 | 0.42 | 6.13 | no short-circuit | — |
| Test Example 3-14 | 10 | 2000 | 33.2 | 0.43 | 5.99 | no short-circuit | — |
| Test Example 3-15 | 10 | 5000 | 33.5 | 0.46 | 5.87 | no short-circuit | — |
| Test Example 3-16 | 20 | 200 | 30.7 | 0.35 | 6.13 | no short-circuit | — |
| Test Example 3-17 | 20 | 500 | 30.9 | 0.36 | 6.07 | no short-circuit | — |
| Test Example 3-18 | 20 | 2000 | 31.1 | 0.36 | 5.82 | no short-circuit | — |
| Test Example 3-19 | 20 | 5000 | 31.4 | 0.38 | 5.82 | no short-circuit | — |
| Test Example 3-20 | 25 | 5000 | 29.0 | 0.37 | 5.20 | no short-circuit | Fine resin fiber flies over film surface |

In Table 3, Test Example 3-1, Test Example 3-5, Test Example 3-10, Test Example 3-15, Test Example 3-19, are Test Example 3-20 were compared with each other. That is, Test examples which used fine resin fibers having a diameter of 0.3 μm, 0.5 μm, 5 μm, 10 μm, 20 μm, or 25 μm, and a length of 5000 μm were compared with each other. With this comparison, the following evaluation was obtained.

In Test Example 3-1 (diameter of 0.3 μm), the fine resin fibers had a small diameter, so it might be impossible to prevent short-circuit because fine concavo-convexes of a metal material are not covered with fiber diameters. Thus, short-circuit occurred. In Test Example 3-20 (diameter of 25 μm), the fine resin fibers had a large diameter, fiber cones were strengthened, and the fibers flied over the film surface at the time of film formation. Further, rigidity of the fibers interfered with the flow of resin at the time of fusion-bonding, so seal strength was degraded.

In Test Example 3-5 (diameter of 0.5 μm), Test Example 3-10 (diameter of 5 μm), Test Example 3-15 (diameter of 10 μm), and Test Example 3-19 (diameter of 20 μm), it was confirmed that short-circuit could be suppressed without affecting adhesion or sealing properties.

In Table 3, Test Example 3-6, Test Example 3-7, Test Example 3-8, Test Example 3-9, Test Example 3-10, and Test Example 3-11 were compared with each other. That is, Test Examples which used fine resin fibers having a diameter of 5 μm and a length of 120 μm, 200 μm, 500 μm, 2000 μm, 5000 μm, or 7000 μm were compared with each other. With this comparison, the following evaluation was obtained.

In Test Example 3-6 (length of 120 μm), the fine resin fibers had a small length and there is no enmeshing. Accordingly, even when the fine concavo-convexes of the metal material pressed the fibers, there is no resistance, so short-circuit occurred. In Test Example 3-11 (length of 7000 μm), the fine resin fibers had a large length, so the fine resin fibers flied over the film surface at the time of film formation. Further, there is strong enmeshing between fibers, so the fibers acted as resistive components at the time of molding, which caused deterioration in molding properties.

In Test Example 3-7 (length of 200 μm), Test Example 3-8 (length of 500 μm), Test Example 3-9 (length of 2000 μm), and Test Example 3-10 (length of 5000 μm), it was confirmed that short-circuit could be suppressed without affecting adhesion or sealing properties.

From the above-described comparison, when fine resin fibers having a diameter of 5 μm to 20 μm and a length of 200 μm to 5000 μm were used, it was confirmed that the most excellent effects were obtained.

Test Example 4-1

Similarly to Test Example 1-3, Tests (1) to (4) were conducted.

Test Example 4-2

As the inner resin film 41c for bonding and the sealants 43a and 43b, unstretched polypropylene (CPP) in which 15 vol % of PET fibers having a diameter of 10 μm and a length of 500 μm as fine resin fibers were blended and 5 wt % of titanium oxide having a particle size D50 of 1.2 μm was blended was used. Others were the same as in Test Example 4-1, and the tests (1) to (4) were conducted.

Test Example 4-3

As the inner resin film 41c for bonding and the sealants 43a and 43b, unstretched polypropylene (CPP) in which 15 vol % of PET fibers having a diameter of 10 μm and a length of 500 μm as fine resin fibers were blended and 5 wt % of titanium oxide having a particle size D50 of 0.5 μm was blended was used. Others were the same as in Test Example 4-1, and the tests (1) to (4) were conducted.

Test Example 4-4

As the inner resin film 41c for bonding and the sealants 43a and 43b, unstretched polypropylene (CPP) in which 15 vol % of PET fibers having a diameter of 10 μm and a length of 500 μm as fine resin fibers were blended and 5 wt % of silicon oxide having a particle size D50 of 2.0 μm was blended was used. Others were the same as in Test Example 4-1, and the tests (1) to (4) were conducted.

Test Example 4-5

As the inner resin film 41c for bonding and the sealants 43a and 43b, unstretched polypropylene (CPP) in which 15 vol % of PET fibers having a diameter of 10 μm and a length of 500 μm as fine resin fibers were blended and 5 wt % of silicon oxide having a particle size D50 of 0.4 μm was blended was used. Others were the same as in Test Example 4-1, and the tests (1) to (4) were conducted.

Test Example 4-6

As the inner resin film 41c for bonding and the sealants 43a and 43b, unstretched polypropylene (CPP) in which 15 vol % of PET fibers having a diameter of 10 μm and a length of 500 μm as fine resin fibers were blended and 5 wt % of aluminum oxide having a particle size D50 of 1.0 μm was blended was used. Others were the same as in Test Example 4-1, and the tests (1) to (4) were conducted.

Test Example 4-7

As the inner resin film 41c for bonding and the sealants 43a and 43b, unstretched polypropylene (CPP) in which 15 vol % of PET fibers having a diameter of 10 μm and a length of 500 μm as fine resin fibers were blended and 5 wt % of titanium oxide having a particle size D50 of 0.5 μm was blended was used. Others were the same as in Test Example 4-1, and the tests (1) to (4) were conducted.

Table 4 shows the results of Test Examples 4-1 to 4-7.

TABLE 4

| | Filler Material | Particle size (D50) μm | Seal strength [N/15 mm] | Cleaving pressure measurement [Mpa] | Molding property [mm] | Short-circuit confirmation |
|---|---|---|---|---|---|---|
| Test Example 4-1 | No | — | 33.0 | 0.42 | 6.13 | no short-circuit |
| Test Example 4-2 | Titanium oxide | 1.2 | 29.2 | 0.36 | 5.88 | no short-circuit |
| Test Example 4-3 | Titanium oxide | 0.5 | 30.8 | 0.38 | 6.02 | no short-circuit |
| Test Example 4-4 | Silicon oxide | 2.0 | 27.8 | 0.36 | 5.82 | no short-circuit |
| Test Example 4-5 | Silicon oxide | 0.4 | 30.8 | 0.38 | 6.01 | no short-circuit |
| Test Example 4-6 | Aluminum oxide | 1.0 | 29.9 | 0.38 | 5.96 | no short-circuit |
| Test Example 4-7 | Aluminum oxide | 0.5 | 31.0 | 0.39 | 6.00 | no short-circuit |

As shown in Table 4, even when a material made by adding fine resin fibers to thermal adhesive resin and further combining an inorganic filler was used, it was confirmed that short-circuit could be suppressed without affecting adhesion or sealing properties.

<Evaluation of Volume Efficiency>
<Sample 1>

A laminate film battery having a battery height of 100 mm configured as shown in FIG. 17 was manufactured as Sample 1. In this case, the seal width of the seal portion for leading the positive electrode lead and the negative electrode lead was 3 mm. That is, the positive electrode, the negative electrode, and the separator were wound together with the gel electrolyte so as to manufacture a battery element, the battery element was covered with an aluminum laminate film, and three sides excluding a bent side on the periphery of the battery element were sealed. Thus, the laminate film battery of Sample 1 was obtained.

<Sample 2>

Figure 22:
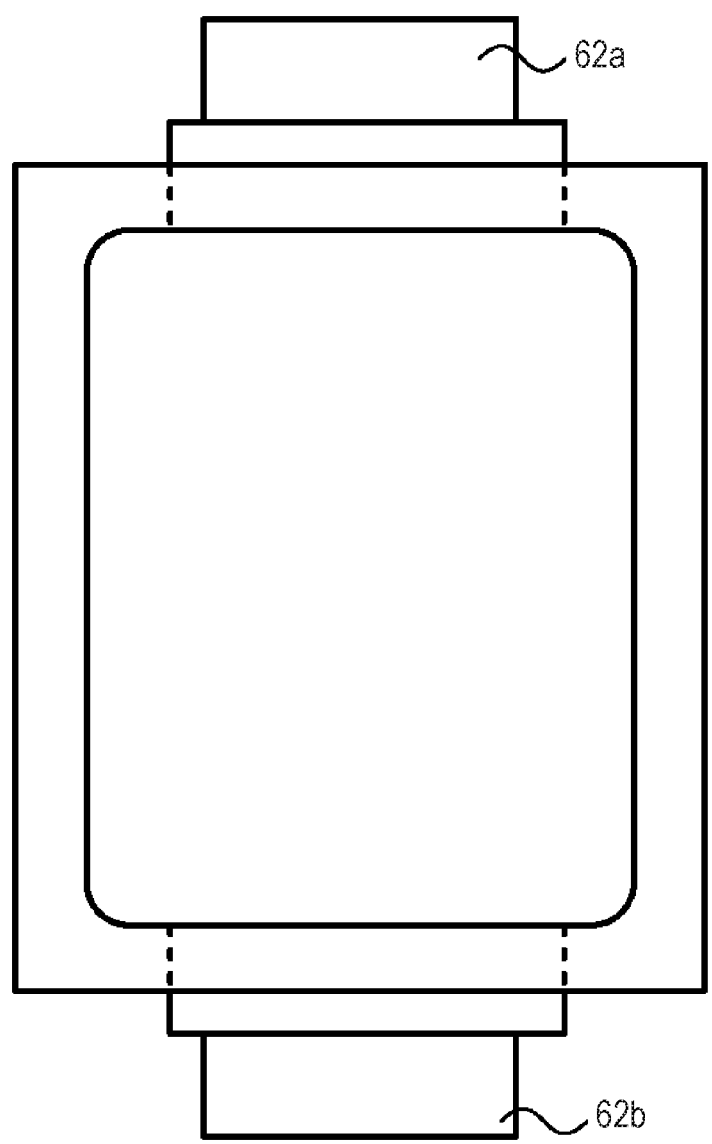
FIG. 22 is a schematic view showing the configuration of a nonaqueous electrolyte battery according to the related art.

A laminate film battery having a battery height of 100 mm configured as shown in FIG. 22 was manufactured as Sample 2. In this case, the seal width of the seal portion of two sides for leading the positive electrode lead and the negative electrode lead was 3 mm. That is, first, the positive electrode, the negative electrode, and the separator were wound together with the gel electrolyte so as to manufacture a battery element, the battery element was covered with an aluminum laminate film, and four sides on the periphery of the battery element were sealed. Thus, the laminate film battery of Sample 2 was obtained.

<Evaluation>

In the laminate film battery of Sample 1, the battery height is 100 mm, and the seal width is 3 mm, and in the laminate film battery of Sample 2, the battery height is 100 mm, and two seal portions are provided with the seal width of 3 mm. That is, in the laminate film battery of Sample 1, a portion capable of being used as a battery element is 100 mm-3 mm=97 mm. In the laminate film battery of Sample 2, a portion capable of being used as a battery element is 100 mm-6 mm=94 mm. Therefore, it could be confirmed that the laminate film battery of Sample 1 could achieve improvement of volume efficiency by about 3% [{1-(94 mm/97 mm)}×100%] as compared with the laminate film battery of Sample 2.

6. Other Embodiments

Although in the first embodiment, the inner resin film 41*c* for bonding and the sealants 43*a* and 43*b* are made of thermal adhesive resin materials, any one of the inner resin film 41*c* for bonding and the sealants 43*a* and 43*b* may be made of a thermal adhesive resin material.

In the nonaqueous electrolyte battery according to the first embodiment, the sealants 43*a* and 43*b* may not be provided. Further, in the battery pack according to the second embodiment, the sealants 6*a* and 6*b* may not be provided.

Although in the second embodiment, the adhesive layer 16*a* of the soft laminate film 1*a*, the adhesive layer 16*b* of the hard laminate film 1*b*, and the sealants 6*a* and 6*b* are made of thermal adhesive resin materials, the invention is not limited thereto. For example, any one of the adhesive layers 16*a* and 16*b* and the sealants 6*a* and 6*b* may be made of a thermal adhesive resin material.

The resin melt (hot melt material) described in the second embodiment may be made of a thermal adhesive resin material.

In the first embodiment, at least one of the inner resin film 41*c* for bonding and the sealants 43*a* and 43*b* may further contain an inorganic filler. In the second embodiment, at least one of the adhesive layer 16*a* of the soft laminate film 1*a*, the adhesive layer 16*b* of the hard laminate film 1*b*, and the sealants 6*a* to 6*b* may further contain an inorganic filler.

Examples of the inorganic filler include titanium oxide, silicon oxide, aluminum oxide, silica, and the like. The kind of the inorganic filler is not limited to the material illustrated, but materials which have been suggested in the related art may be used. The average particle size of the inorganic filler is preferably equal to or smaller than 5 µm, and more preferably, equal to or smaller than 1 µm.

The battery element 4 is not limited to the battery elements 4 described in the first embodiment and the second embodiment. For example, instead of a winding type body, a laminate in which a positive electrode, a polymer electrolyte and/or a separator, and a negative electrode are laminated may be used as a battery element.

Of course, a battery element in which no polymer electrolyte is provided, for example, a battery element in which a positive electrode, a negative electrode, and a separator arranged between the positive electrode and the negative electrode are wound may be used. After the battery element is housed in the laminate film, a liquid-shaped electrolyte may be injected, and the battery element may be dipped in the liquid-shaped electrolyte, thereby forming a battery.

Although in the first embodiment, an example of a lithium-ion battery has been described, and in the second embodiment, an example of a battery pack in which a circuit board having a protection circuit and the like mounted thereon is connected to a lithium-ion battery has been described, the kind of battery is not limited thereto.

The embodiments may be applied to an electric device, such as a capacitor or an electrolytic capacitor, in which an electrode laminate for accumulating electricity is covered with a laminate film.

Although in the third to fifth embodiments, an example where the four sealants 63*a* to 63*d* are used has been described, two hollow sealants each having a hole into which an electrode lead is inserted may be provided. The sealant 63*b* and the sealant 63*c* may be a single sealant. Although an example where the sealants 63*a* to 63*d* have the same width has been described, the sealants 63*a* to 63*d* may be different in width.

Although in the third to fifth embodiments, the positive electrode lead 62*a* is set to have a length smaller than the length of the negative electrode lead 62*b*, the sealants 63*a* to 63*d* may be appropriately changed such that the positive electrode lead 62*a* and the negative electrode lead 62*b* have the same length. Alternatively, the sealants 63*a* to 63*d* may be appropriately changed such that the positive electrode lead 62*a* has a length larger than the length of the negative electrode lead 62*b*.

Although in the fourth embodiment, the positive electrode lead 62*a* and the negative electrode lead 62*b* are set to have the same width, the positive electrode lead 62*a* and the negative electrode lead 62*b* may be set to be different in width.

The modification described in the third embodiment may be applied to the fourth embodiment and the fifth embodiment. Further, in the third to fifth embodiments, the positive electrode lead 62*a* may be a negative electrode lead, and the negative electrode lead 62*b* may be a positive electrode lead.

It should be understood that various changes and modifications to the presently preferred embodiments described herein will be apparent to those skilled in the art. Such The invention is claimed as follows:

1. A battery comprising:
a laminate film comprising a metal layer and a resin layer;
a battery element which is covered by the laminate film; and
a positive electrode lead and a negative electrode lead which are connected to the battery element, and which extend outside the laminate film;
wherein the positive and negative electrode leads are at different positions relative to each other in a width direction of the leads, and portions of the positive electrode lead and the negative electrode lead overlap each other in a thickness direction of the battery, and
wherein the resin layer comprises resin fibers comprising a material selected from the group consisting of polyphenylene oxide, polyphenylene sulfone (PPS), polytetrafluoroethylene (PTFE), and mixtures thereof.

2. The battery according to claim 1, wherein the resin fibers have a diameter of 0.5 μm to 20 μm.

3. The battery according to claim 1, wherein the resin fibers have a length of 200 μm to 5,000 μm.

4. The battery according to claim 1, wherein, when the diameter or short side length of the resin fibers is r (μm), and the thickness of the resin layer is t (μm), the blended amount of the resin fibers in the resin layer is in a range of 10 vol % to (r/t)×100 vol % at a volume ratio with respect to the resin under the condition 0.1 t (μm)<r (μm)≤0.5 t (μm).

5. The battery according to claim 1, wherein the blended amount of the resin fibers in the resin layer ranges from 10 to 25 vol % at a volume ratio with respect to the resin of the resin layer.

6. The battery according to claim 1, wherein the positive electrode lead and the negative electrode lead extend in the same direction.

7. The battery according to claim 1, wherein the resin layer includes a thermal adhesive resin, and the resin fibers of the resin layer and the thermal adhesive resin have resin components in common.

8. The battery according to claim 1, wherein the resin fibers further include an additional material selected from the group consisting of polyethylene terephthalate (PET), aramid, polyimide (PI), and mixtures thereof.

9. The battery according to claim 1, where an extended portion of the positive electrode lead extending from the laminate film and an extended portion of the negative electrode lead extending from the laminate film are different in length, and an extended portion of the sealant extending from the laminate film has a length equal to or larger than a length of a shorter extended portion from the extended portions of the positive electrode lead and the negative electrode lead.

10. The battery according to claim 1, wherein the positive electrode lead and the negative electrode lead have a width equal to or larger than 50% of the width of the battery element, and equal to or smaller than 95% of a battery width.

11. A battery comprising:
a laminate film comprising a metal layer and a resin layer;
a battery element which is covered by the laminate film;
a positive electrode lead and a negative electrode lead which are connected to the battery element, and which extend outside the laminate film; and
a sealant provided between the leads and the resin layer;
wherein the positive and negative electrode leads are at different positions relative to each other in a width direction of the leads, and
wherein the sealant comprises resin fibers comprising a material selected from the group consisting of polyphenylene oxide, polyphenylene sulfone (PPS), polytetrafluoroethylene (PTFE), and mixtures thereof, the resin layer includes a thermal adhesive resin, and the resin fibers of the sealant and the thermal adhesive resin have resin components in common.

12. The battery according to claim 11, wherein the resin fibers have a diameter of 0.5 μm to 20 μm.

13. The battery according to claim 11, wherein the resin fibers have a length of 200 μm to 5,000 μm.

14. The battery according to claim 11, wherein, when the diameter or short side length of the resin fibers is r (μm), and the thickness of the resin layer is t (μm), the blended amount of the resin fibers in the resin layer is in a range of 10 vol % to (r/t)×100 vol % at a volume ratio with respect to the resin under the condition 0.1 t (μm)<r (μm)≤0.5 t (μm).

15. The battery according to claim 11, wherein the blended amount of the resin fibers in the resin layer ranges from 10 to 25 vol % at a volume ratio with respect to the resin of the resin layer.

16. The battery according to claim 11, wherein the positive electrode lead and the negative electrode lead extend in the same direction.

17. The battery according to claim 11, wherein portions of the positive electrode lead and the negative electrode lead overlap each other in a thickness direction of the battery.

18. The battery according to claim 11, wherein the resin fibers further include an additional material selected from the group consisting of polyethylene terephthalate (PET), aramid, polyimide (PI) and mixture thereof.

19. The battery according to claim 11, where an extended portion of the positive electrode lead extending from the laminate film and an extended portion of the negative electrode lead extending from the laminate film are different in length, and an extended portion of the sealant extending from the laminate film has a length equal to or larger than a length of a shorter extended portion from the extended portions of the positive electrode lead and the negative electrode lead.

20. The battery according to claim 11, wherein the positive electrode lead and the negative electrode lead have a width equal to or larger than 50% of the width of the battery element, and equal to or smaller than 95% of a battery width.

21. A battery comprising:
a laminate film comprising a metal layer and a resin layer;
a battery element which is covered by the laminate film;
a positive electrode lead and a negative electrode lead which are connected to the battery element, and which extend outside the laminate film; and
a sealant provided between the leads and the resin layer;
wherein the positive and negative electrode leads are at different positions relative to each other in a width direction of the leads, and
wherein the resin layer and the sealant respectively comprise resin fibers comprising a material selected from the group consisting of polyphenylene oxide, polyphenylene sulfone (PPS), polytetrafluoroethylene (PTFE), and mixtures thereof, the resin layer further includes a thermal adhesive resin, and the resin fibers of the sealant and the thermal adhesive resin have resin components in common.

22. A battery pack comprising:
a first laminate film having a first metal layer and a first resin layer;
a second laminate film having a second metal layer and a second resin layer;
a battery element which is housed between the first laminate film and the second laminate film; and
a positive electrode lead and a negative electrode lead which are connected to the battery element, are which are sandwiched between the first resin layer and the second resin layer and arranged to be opposite each other, and extend outside the first laminate film and the second laminate film;
wherein the positive and negative electrode leads are at different positions relative to each other in a width direction of the leads, and portions of the positive electrode lead and the negative electrode lead overlap each other in a thickness direction of the battery, and
wherein at least one of the first resin layer and the second resin layer comprises resin fibers comprising a material selected from the group consisting of polyphenylene oxide, polyphenylene sulfone (PPS), polytetrafluoroethylene (PTFE), and mixtures thereof.

23. The battery pack according to claim 22, wherein the first laminate film further comprises a first outer resin film, and/or the second laminate film further comprises a second outer resin film.

24. The battery pack according to claim 22, wherein the second metal layer is softer than the first metal layer.

25. The battery pack according to claim 22, further comprising a circuit board which is connected to the leads.

26. A battery pack comprising:
a first laminate film having a first metal layer and a first resin layer;
a second laminate film having a second metal layer and a second resin layer;
a battery element which is housed between the first laminate film and the second laminate film;
a positive electrode lead and a negative electrode lead which are connected to the battery element, are which are sandwiched between the first resin layer and the second resin layer and arranged to be opposite each other, and extend outside the first laminate film and the second laminate film; and
a sealant is provided between the leads and the first resin layer and/or between the leads and the second resin layer,
wherein the positive and negative electrode leads are at different positions relative to each other in a width direction of the leads, and
wherein the sealant comprises resin fibers comprising a material selected from the group consisting of polyphenylene oxide, polyphenylene sulfone (PPS), polytetrafluoroethylene (PTFE), and mixtures thereof, at least one of the first or second resin layers includes a thermal adhesive resin, and the resin fibers of the sealant and the thermal adhesive resin have resin components in common.

27. The battery pack according to claim 26, wherein the first laminate film further comprises a first outer resin film, and/or the second laminate film further comprises a second outer resin film.

28. The battery pack according to claim 26, wherein the second metal layer is softer than the first metal layer.

29. The battery pack according to claim 26, further comprising a circuit board which is connected to the leads.

30. An electronic apparatus comprising the battery according to claim 1.

31. An electronic apparatus comprising the battery according to claim 11.

32. An electronic apparatus comprising the battery pack according to claim 22.

33. An electronic apparatus comprising the battery pack according to claim 26.

* * * * *